US008291625B2

(12) United States Patent
Lee et al.

(10) Patent No.: US 8,291,625 B2
(45) Date of Patent: Oct. 23, 2012

(54) METHOD FOR TRANSMITTING INFORMATION FOR INTER-RADIO ACCESS TECHNOLOGY HANDOVER

(75) Inventors: Jin Lee, Anyang-Si (KR); Gi Won Park, Anyang-Si (KR); Yong Ho Kim, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 12/498,070

(22) Filed: Jul. 6, 2009

(65) Prior Publication Data

US 2010/0008324 A1    Jan. 14, 2010

Related U.S. Application Data

(60) Provisional application No. 61/078,338, filed on Jul. 4, 2008, provisional application No. 61/113,001, filed on Nov. 10, 2008.

(30) Foreign Application Priority Data

Oct. 6, 2008 (KR) .................. 10-2008-0097622
Nov. 21, 2008 (KR) .................. 10-2008-0116522

(51) Int. Cl.
*H04B 7/212* (2006.01)

(52) U.S. Cl. ........... 37/331; 370/329; 370/335; 370/320

(58) Field of Classification Search .................. 370/331, 370/332, 389, 400; 455/434, 438, 437, 439, 455/436, 513, 574
See application file for complete search history.

(56) References Cited

U.S. PATENT DOCUMENTS

| 2003/0117980 | A1* | 6/2003 | Kim et al. ...................... 370/332 |
| 2007/0097914 | A1 | 5/2007 | Grilli et al. |
| 2007/0265001 | A1* | 11/2007 | Dias et al. .................. 455/435.1 |
| 2008/0014957 | A1 | 1/2008 | Ore |
| 2009/0135755 | A1* | 5/2009 | Qi et al. ........................ 370/311 |

FOREIGN PATENT DOCUMENTS

| KR | 10-2007-0053312 A | 5/2007 |
| WO | WO 2005/089249 A2 | 9/2005 |
| WO | WO 2008/014418 A2 | 1/2008 |

* cited by examiner

*Primary Examiner* — Hassan Phillips
*Assistant Examiner* — Anez Ebrahim
(74) *Attorney, Agent, or Firm* — Birch, Stewart, Kolasch & Birch, LLP

(57) ABSTRACT

A method for transmitting and receiving inter-radio access technology (RAT) information for inter-RAT handover between a mobile station and a base station in a radio access system. A method for transmitting inter-RAT information for inter-RAT handover comprises: receiving a super frame header (SFH) including a flag indicating whether the inter-RAT information is transmitted in a current superframe and a start frame number field indicating a predetermined frame at which the inter-RAT information is transmitted, and if the flag is set, acquiring the inter-RAT information at a predetermined frame indicated by the start frame number field.

11 Claims, 16 Drawing Sheets

(a)

(b)

(a)

(b)

(a)

(b)

METHOD FOR TRANSMITTING INFORMATION FOR INTER-RADIO ACCESS TECHNOLOGY HANDOVER

CROSS-REFERENCE TO RELATED APPLICATIONS

This application claims the benefit of the Korean Patent Applications No. 10-2008-0097622, filed on Oct. 6, 2008, and No. 10-2008-0116522, filed on Nov. 21, 2008 which are hereby incorporated by reference as if fully set forth herein.

This application also claims the benefit of U.S. Provisional Application Ser. Nos. 61/078,338, filed on Jul. 4, 2008 and 61/113,001, filed on Nov. 10, 2008, the contents of which are hereby incorporated by reference herein in their entirety.

BACKGROUND OF THE INVENTION

1. Field of the Invention

The present invention relates to a method for transmitting and receiving inter-radio access technology (inter-RAT) information between a mobile station and a base station for inter-RAT handover in a radio access system. The present invention also relates to a new header structure and a data transmitting and receiving method, for supporting inter-RAT handover.

2. Discussion of the Related Art

Exemplary embodiments of the present invention describe handover between different networks, i.e., inter-RAT handover. Hereinafter, general handover and inter-RAT media independent handover (MIH) will be described in brief.

Handover refers to a function that allows a mobile station (MS), which is making a call, to continue to maintain the call even when the MS moves from a service area of a base station (BS) to a service area of another BS in a communication zone such as a mobile communication cell.

Handover occurs when a radio channel within a BS to which an MS belongs is in a poor state, when an MS moves from a current sector within a BS to another sector, and when an MS moves from a current BS area to another BS area.

Handover may be divided into softer handover, soft handover, hard handover, etc. according to how a radio channel is switched.

Softer handover is carried out within one cell and refers to switching to a good channel from among channels used by an MS within a cell coverage. Soft handover refers to a process in which an MS simultaneously uses two neighboring channels and gradually disconnects one of them in the end. A code division multiple access (CDMA) scheme can easily achieve soft handover because MSs use the same frequency band. Hard handover refers to a process in which an MS stops using a current call-connected channel and immediately connects to another channel.

Handover may be divided into a network controlled handoff (NCHO), a mobile assisted handoff (MAHO), and a mobile controlled handoff (MCHO), according to who performs handover.

Intra radio access technology (intra-RAT) handover supports handover between homogeneous networks. Intra-RAT handover provides seamless handover and service continuity when an MS moves from an area of a BS (e.g., a serving BS) controlling the MS within a homogeneous network to an area managed by another BS (a target BS), thereby increasing MS user convenience.

Inter-RAT handover (or, Inter-RAT network handover) supports handover between heterogeneous networks using different radio access technologies. For example, inter-RAT handover is carried out when an MS moves from a cell area of a serving BS within a homogeneous network to a cell area of a target BS within a heterogeneous network. The inter-RAT handover may also be called handover between heterogeneous networks or MIH between heterogeneous networks.

Institute of electrical and electronic engineers (IEEE) 802.21, which is currently under development for an international standard concerning MIH between heterogeneous networks, is designed to increase MS user convenience by providing seamless handover and service continuity between heterogeneous networks.

The IEEE 802.21 standard supports handover between different radio access networks to improve user experience and support cooperative use of information used in an MS and a network. To this end, an access point of a network, such as an MS and a BS, should provide a multi-mode. This means that plural radio standards can be supported and, simultaneously, connection on a radio interface can be permitted.

An MS may be a multi-mode node supporting one or more interface types that take various forms. For example, the interface types may be a wire-line form such as IEEE 802.3 based Ethernet, a radio interface form based on an IEEE 802.XX-series wireless interface including IEEE 802.11, IEEE 802.15, or IEEE 802.14, and an interface defined by a cellular standard institute such as 3GPP or 3GPP2.

A multi-mode MS includes a physical layer and a media access control (MAC) layer of each mode. An MIH layer is located under an Internet protocol (IP) layer. An MIH function (MIHF) of an MS is a logical entity and may be freely located within a protocol stack while interfacing with each layer through a service access point (SAP).

MIH is preferably defined between IEEE 802-series interfaces or between the IEEE 802-series interfaces and the above-described non-IEEE 802-series interfaces (e.g., 3GPP or 3GPP2). To provide seamless service when a user performs handover, it is desirable that the MIH support a mobility support protocol of an upper layer such as mobile IP and session initiation protocol (SIP).

MIHF, which is a logical MIH entity, allows an MS to perform inter-RAT handover. An MS and a network may include MIHFs. The MIHFs serve to transmit and receive information about setting or state of an access network around the MS.

The MIH entity is located under an upper layer including an IP layer and defines handover between an IEEE 802-series interface and an interface defined by 3GPP/3GPP2, as well as handover between IEEE 802-series interfaces. Namely, the MIH entity obtains information about heterogeneous networks from a second layer to facilitate inter-RAT handover. Meanwhile, the MIHF may exchange MIH signaling using information from a third layer, such as user policy or configuration.

SUMMARY OF THE INVENTION

To perform inter-RAT handover in a radio access system to which exemplary embodiments of the present invention is applicable, an MS and a BS should obtain information about neighboring heterogeneous networks. In this case, it is desirable to use MIHF technology.

However, in order for an MS to attempt inter-RAT handover in a radio access system demanding multiple radio operations, information about neighboring heterogeneous networks is required.

In a general technology, an MS cannot acquire information necessary for inter-RAT handover, so that handover to a radio access system using inter-RAT cannot be carried out.

An object of the present invention devised to solve the problem lies in providing an efficient handover method.

Another object of the present invention devised to solve the problem lies in providing a method for transmitting inter-RAT information for inter-RAT handover.

A further object of the present invention devised to solve the problem lies in providing a superframe structure for transmitting inter-RAT information.

The object of the present invention can be achieved by providing a method for transmitting and receiving inter-RAT information between an MS and a BS to perform inter-RAT handover in a radio access system. The present invention also provides a new header structure and a data transmitting and receiving method, for supporting inter-RAT handover.

In one aspect of the present invention, provided herein is a method for transmitting inter-RAT information for inter-RAT handover, comprising: receiving a super frame header (SFH) including a flag (or an indicator) indicating whether the inter-RAT information is transmitted and a start frame number (SFN) field indicating a predetermined frame in which the inter-RAT information is transmitted, and if the flag is set, acquiring the inter-RAT information in the predetermined frame indicated by the start frame number field. The indicator may be periodically transmitted. The superframe header may include a broadcast channel and the flag is allocated to the broadcast channel. The broadcast channel may include a primary broadcast channel and a secondary broadcast channel, and the indicator may be included in either the primary broadcast channel or the secondary broadcast channel.

The start frame number field may be included in either the primary broadcast channel or the secondary broadcast channel.

If the flag indicates that the inter-RAT information is not transmitted in the current superframe, the method may further include transmitting, at a mobile station, a request message requesting the inter-RAT information to a base station, and receiving, at the mobile station, a response message including the inter-RAT information from the base station. The response message may be transmitted to one or more mobile stations in broadcast form.

The request message may include an urgent information field indicating whether acquisition of the inter-RAT information is urgent. If the base station does not include the inter-RAT information, the response message may further include information about an expected time at which the inter-RAT information is to be transmitted. If the base station does not include the inter-RAT information, the base station may acquire the inter-RAT information from a target network information server and transmits the inter-RAT information to the mobile station.

The superframe header may be a subframe header.

In another aspect of the present invention, provided herein is a method for transmitting inter-RAT information for inter-RAT handover, including periodically transmitting, at a base station, a superframe header which includes an indicator indicating whether the inter-RAT information is present in a predefined superframe, receiving a request message requesting the inter-RAT information from a mobile station, wherein the request message includes an urgent information field indicating whether acquisition of the inter-RAT information is urgent, and transmitting a first response message including the inter-RAT information to the mobile station.

The superframe may include a broadcast channel including a primary broadcast channel and a secondary broadcast channel, and the indicator may be included in either the primary broadcast channel or the secondary broadcast channel.

If the base station does not know the inter-RAT information, the method may further include acquiring the inter-RAT information from an information server.

If the urgent information field is set, the base station may immediately transmit the first response message to the mobile station.

If the urgent information field is set, the method may further include immediately transmitting, to the mobile station, a second response message indicating a frame in which the first response message is to be transmitted.

In still another aspect of the present invention, provided herein is a method for transmitting inter-radio access technology (RAT) information at a base station for inter-RAT handover, the method comprising transmitting a superframe header (SFH) which including a flag indicating whether the inter-RAT information is present in a current superframe and a start frame number (SFN) field indicating a predetermined frame in which the inter-RAT information is transmitted, when the flag is set, transmitting the inter-RAT information at the predetermined frame, wherein the predetermined frame is included in the superframe.

The superframe may include a broadcast channel including a primary broadcast channel and a secondary broadcast channel and the flag is included in either the primary broadcast channel or the secondary broadcast channel.

The start frame number (SFN) field may be included in either the primary broadcast channel or the secondary broadcast channel. Also, the super frame header (SFH) can be a subframe header.

The exemplary embodiments of the present invention have the following effects.

First, efficient handover can be performed.

Second, inter-RAT handover can be efficiently performed.

Third, inter-RAT information can be efficiently obtained using a superframe structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIGS. 4(a) and 4(b) illustrates another example of a superframe structure according to an exemplary embodiment of the present invention;

DETAILED DESCRIPTION OF THE INVENTION

Figure 1:
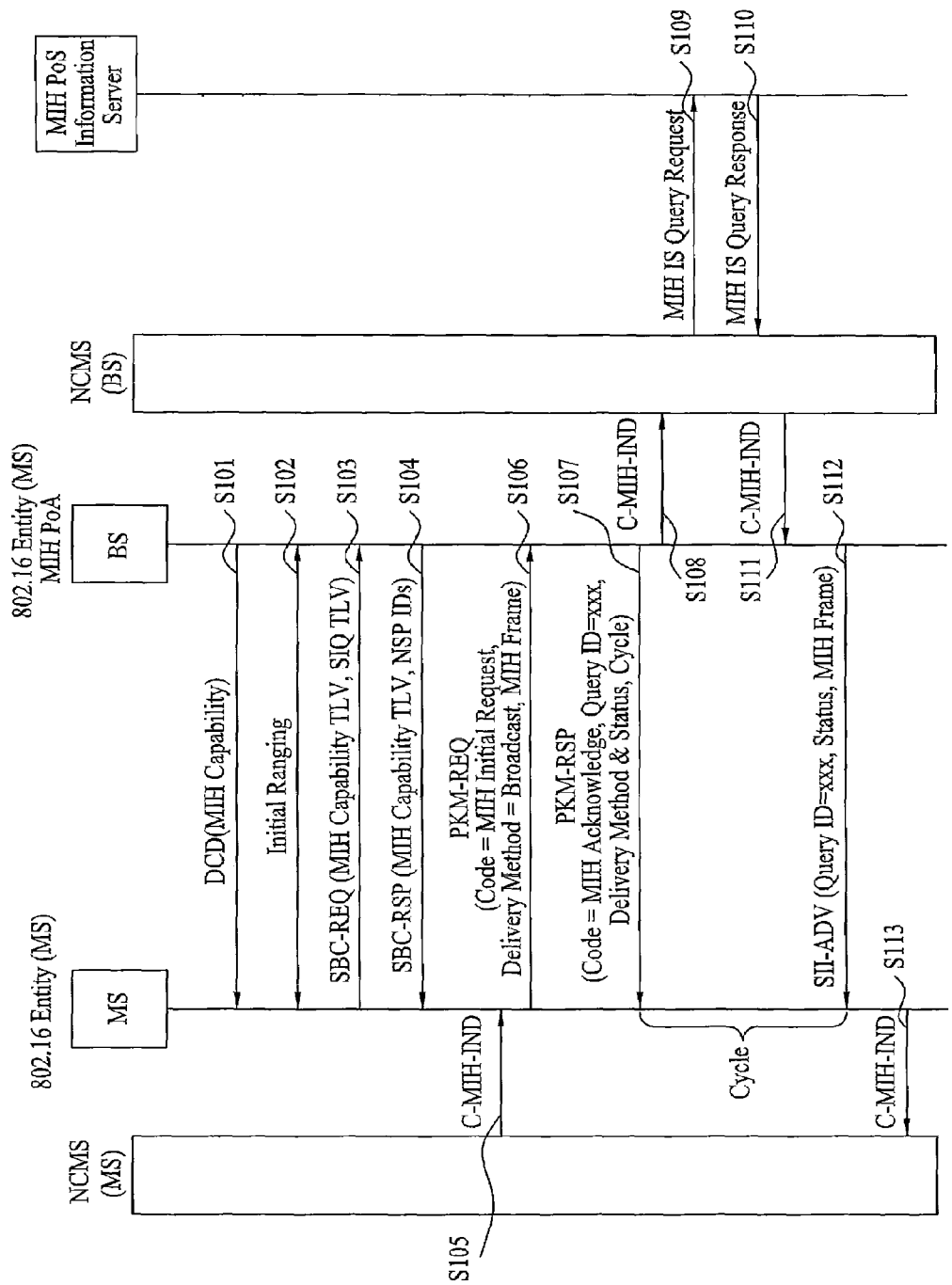
FIG. 1 illustrates a method for transmitting inter-RAT information using a broadcasting scheme.

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The present invention provides a radio access system and a method for transmitting and receiving inter-RAT information between an MS and a BS to perform inter-RAT handover in the radio access system. The present invention also provides a new header structure and a data transmitting and receiving method, for supporting inter-RAT handover.

The exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In a description of the drawings, procedures or steps which may obscure the subject matter of the present invention will not be described and procedures or steps which can be understood by those skilled in the art will also be omitted.

In the exemplary embodiments of the present invention, a description is made of a data transmission and reception relationship between a base station (BS) and a mobile station (MS). Here, the term 'BS' refers to a terminal node of a network communicating directly with the MS. In some cases, a specific operation described as performed by the BS may be performed by an upper node of the BS.

Namely, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'advanced base station (ABS)', or 'access point', etc. The term 'MS' may be replaced with the term 'user equipment (UE)', 'subscriber station (SS)', 'mobile subscriber station (MSS)', 'advanced mobile station (AMS)', or 'mobile terminal', etc.

A transmitting end refers to a node which transmits a data or voice service and a receiving end refers to a node which receives a data or voice service. Therefore, in uplink, an MS may correspond to the transmitting end and a BS may correspond to the receiving end. Similarly, in downlink, the MS may correspond to the receiving end and the BS may correspond to the transmitting end.

An MS employed in the present invention may be a personal digital assistant (PDA), a cellular phone, a personal communication service (PCS) phone, a global system for mobile (GSM) phone, a wideband code division multiple access (wide CDMA) phone, a mobile broadband system (MBS) phone, etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit may be located at the interior or exterior of the processor and may transmit data to and receive data from the processor via various known means.

The embodiments of the present invention can be supported by standard documents disclosed in at least one of the IEEE 802 system, the 3GPP system, the 3GPP LTE system, and the 3GPP2 system which are radio access systems. That is, steps or portions that are not described in the embodiments of the present invention for the sake of clearly describing the spirit of the present invention may be supported by the above documents. For all terms used in this disclosure, reference can be made to the above standard documents. Especially, the embodiments of the present invention may be supported by P802.16e-2005 or P802.16Rev2 which is a standards document of the IEEE 802.16 system.

The specific terms described in the following description are provided to aid the understanding of the present invention and those terms may be changed without departing from the spirit of the present invention.

FIG. 1 illustrates a method for transmitting inter-RAT information using a broadcasting scheme.

Referring to FIG. 1, a BS (802.16 entity MIH PoA) may transmit MIH capability information through downlink channel descriptor (DCD) system information to an MS (802.16 entity) (step S101).

The MS and the BS perform an initial ranging procedure (step S102).

The MS may transmit a subscriber station basic capability request (SBC-REQ) message to the BS to request an MIH capability type-length-value (TLV) field, a service information query (SIQ) TLV field, etc. (step S103).

The BS may transmit a subscriber station basic capability response (SBC-RSP) message including an MIH capability TLV, a network service provider (NSP) ID, etc. to the MS (step S104).

A network control and management system (NCMS), which is an upper layer of the MS, may transmit, to the MS, a C-MIH-IND message directing the MS to receive an MIH message in order to receive inter-RAT information (step S105).

The MS which has acquired MIH capability information may transmit a privacy key management request (PKM-REQ) message including an MIH query frame to the BS to obtain inter-RAT information. The PKM-REQ message may include fields indicating a code denoting an MIH initial request, a delivery method, and a specific MIH frame (step S106).

The BS may transmit, to the MS, a privacy key management response (PKM-RSP) message which includes fields indicating acknowledgement, an ID, a delivery method and a status, and a cycle for an MIH request (step S107).

The BS may transmit a C-MIH-IND message for requesting transmission of the MIH message to an NCMS which is an upper layer of the BS (step S108).

The NCMS, which is an upper layer of the BS, may transmit an MIH IS query request message including an MIH frame to an MIH PoS information server to request inter-RAT information (step S109).

The information server may transmit an information IS query response message including the inter-RAT information to the NCMS of the BS (step S110).

The NCMS of the BS may transmit, to the BS, a C-MIH-IND message directing the BS to transmit the MIH message (step S111). The BS may transmit a service identity information advertisement (SII-ADV) message which includes the MIH frame indicating the inter-RAT information to one or more MSs after the cycle transmitted to the MS in step S107. The MS may receive the SII-ADV message which is broadcast by the BS after a predefined period time from step S107 (step S112).

The MS may transmit a C-MIH-IND message in response to the SII-ADV message to the NCMS thereof to inform the NCMS that the MIH frame has been received (step S113).

In exemplary embodiments of the present invention, the inter-RAT information may include handover policy, channel information, operator information, and IP address setting information.

Figure 2:
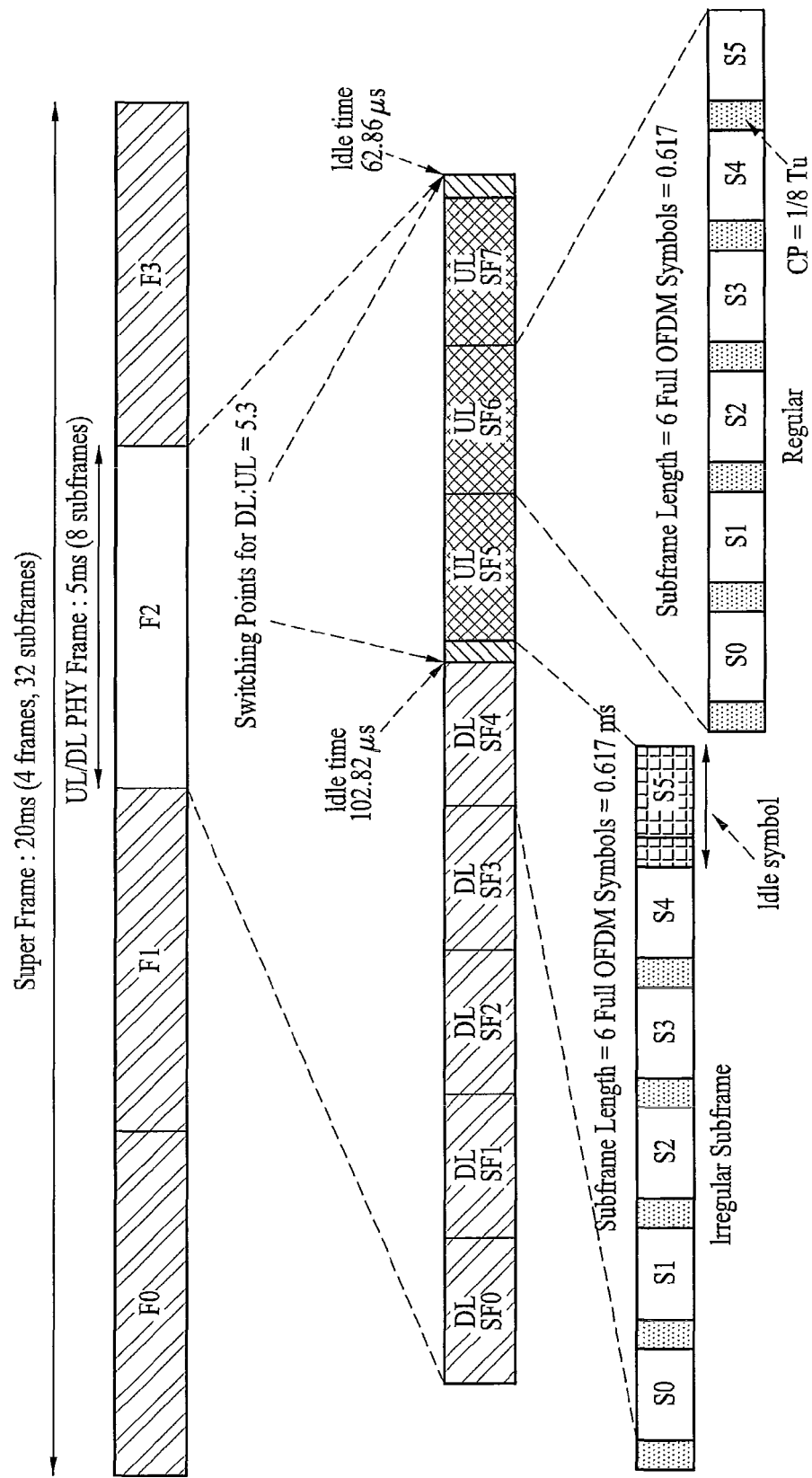
FIG. 2 illustrates an example of a frame structure which may be used in exemplary embodiments of the present invention.

FIG. 2 illustrates an example of a frame structure which may be used in exemplary embodiments of the present invention.

Referring to FIG. 2, one superframe may include one or more frames, each frame including one or more subframes. One subframe may include one or more orthogonal frequency division multiple access (OFDMA) symbols.

The length and number of superframes, subframes, and symbols may be varied according to a user request or system environment. The term 'subframe' used in the exemplary embodiments of the present invention refers to all lower frame structures generated by dividing one frame into prescribed lengths.

A subframe structure used in the exemplary embodiments of the present invention may be constructed by dividing a generally used frame into one or more subframes. The number of subframes included in one frame may be determined by the number of symbols constituting the subframe. For example, if one subframe is constructed by 6 symbols under the assumption that one frame is comprised of 48 symbols, then 8 subframes may constitute one frame. If one subframe is comprised of 12 symbols under the above-described assumption, then 4 subframes may constitute one frame.

In FIG. 2, it is assumed that one superframe is 20 ms in length and one frame is 5 ms in length. That is, one superframe may be comprised of 4 frames (F0, F1, F2, and F3). One frame may have a frame structure constructed by 8 subframes, each subframe having 6 OFDMA symbols that are 617 μs in length. Each subframe may be allocated for uplink (UL) or downlink (DL) transmission. In FIG. 2, DL and UL are allocated in a ratio of 5:3.

Figure 3:
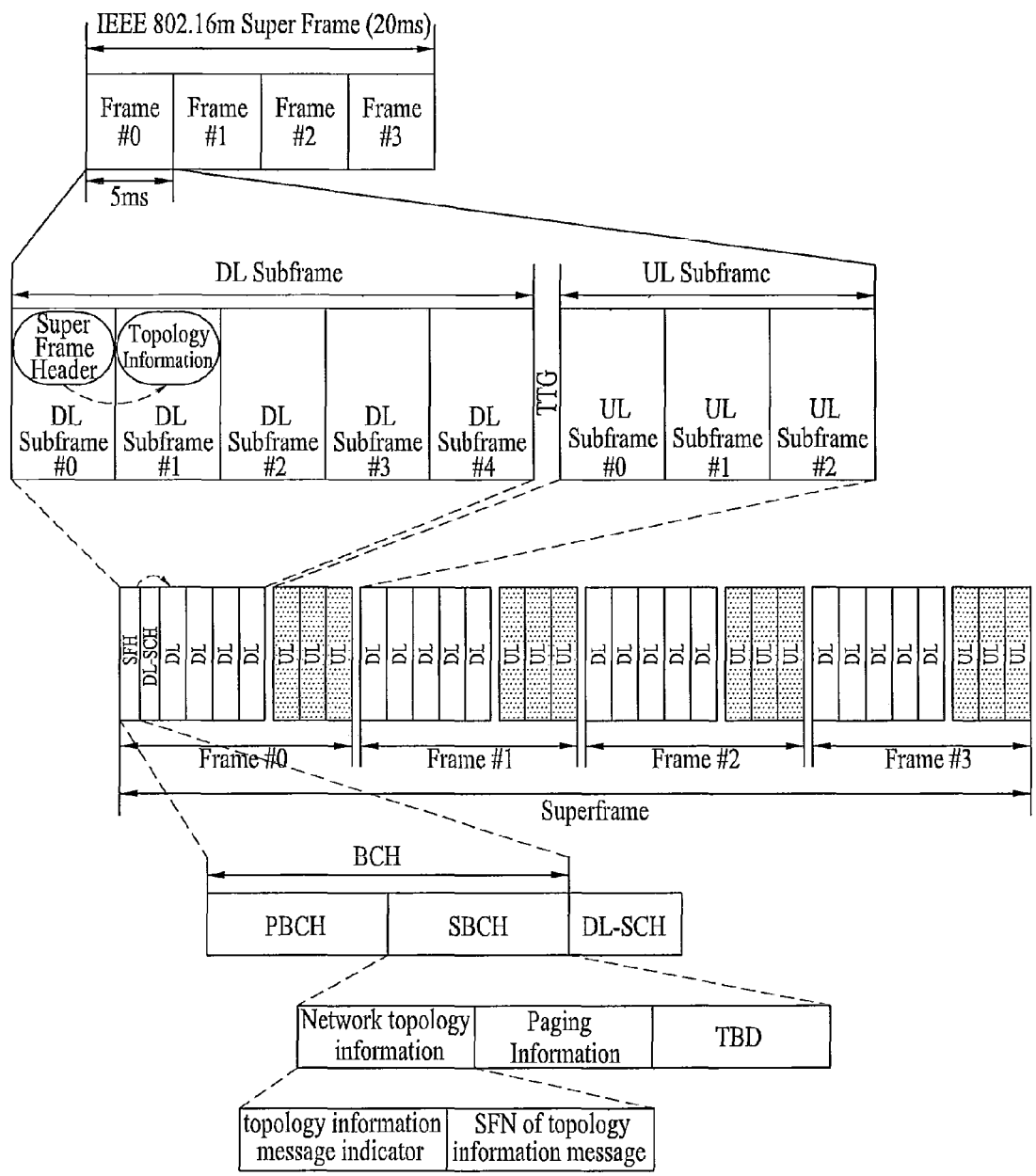
FIG. 3 illustrates an example of a superframe structure and a superframe header structure according to an exemplary embodiment of the present invention.

FIG. 3 illustrates an example of a superframe structure and a superframe header structure according to an exemplary embodiment of the present invention.

FIG. 3 is a more detailed diagram of FIG. 2. As illustrated in FIG. 3, a superframe is 20 ms in length and may be divided into 4 frames. Each frame may be divided into 5 DL subframes and 3 UL subframes.

A superframe header (SFH) may be allocated to the first DL subframe of a superframe. The SFH may include a broadcast channel (BCH) and a DL shared channel (DL-SCH).

The BCH may include a primary BCH (PBCH) and a secondary BCH (SBCH). Broadcast information used commonly in a network may be allocated to the PBCH and cell-specific broadcast information may be allocated to the SBCH.

To support inter-RAT handover (i.e. inter-RAT network handover), the BS may transmit the SFH to the MS. Referring to FIG. 3, the SBCH may include network topology information (NTI), paging information (PI), and other information (TBD).

The NTI may include a network topology information indicator (NTII) and a start frame number (SFN) field. The SFN field indicates a frame (or, a sub-frame) in which a message including the topology information, for example, AAI_ORAT-MSG (Advanced Air interface Other RAT message) or AAI_ORAT-ADV (Advanced Air interface Other RAT Advertise) is transmitted.

The NTII may indicate whether topology information including inter-RAT information is transmitted in a current superframe. If the NTII indicates that the inter-RAT information is transmitted to the MS in a current superframe, the MS confirms the SFN field and may acquire the inter-RAT information (e.g. Other RAT information) by receiving a topology information message (e.g. AAI_ORAT-ADV) from a frame (or, a sub-frame) directed by the SFN field.

The NTII may indicate that the inter-RAT information is not transmitted to the MS in a specific superframe. In this case, the MS confirms an SFH (especially, SBCH) transmitted in the next superframe to acquire topology information for inter-RAT handover. Alternatively, the MS may request the BS to transmit the inter-RAT information without waiting until the next superframe.

In FIG. 3, as another method for transmitting topology information necessary for inter-RAT handover to the MS, the contents of topology information (e.g. other RAT information) may be directly included in the SBCH transmitted to the MS.

In the exemplary embodiments of the present invention, the topology information may include both homogeneous network topology information and heterogeneous network topology information. Alternatively, the topology information may include either the homogeneous network topology information or the heterogeneous network topology information.

In FIG. 3, the BS may continuously transmit topology information including inter-RAT information to the MS at a predefined period (e.g., 20 ms). Alternatively, the BS may broadcast the topology information including the inter-RAT information in the form of being included in a neighbor BS advertisement (NBR-ADV) message to the MS whenever necessary or periodically.

In the exemplary embodiments of the present invention, the NTII may be called a topology information message indicator or other RAT information flag. If the other RAT information flag is set, it means that a current superframe carries other RAT information. Also, the SFH can be able to contain SFN where a topology information message (e.g. AAI_ORAT-MSG or AAI_ORAT-ADV) is transmitted in order to notify the MS of the start frame of the message. The topology information may be called other RAT information and may have the same meaning as a topology information message.

Figure 4:
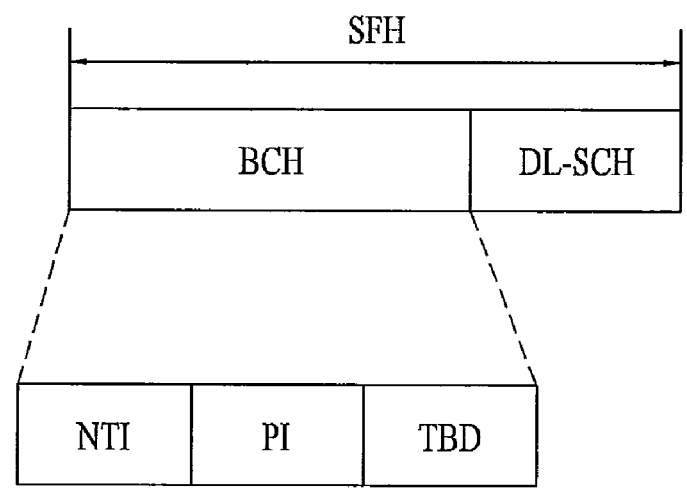
FIG. 4 including
Figure 4:
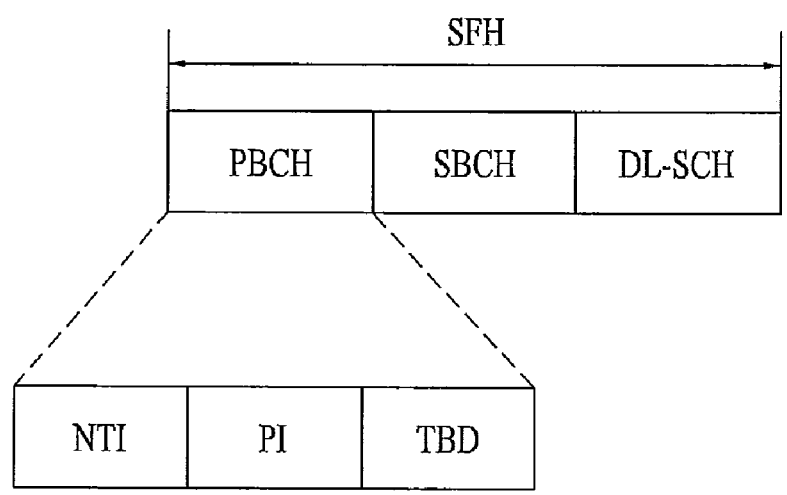

FIG. 4 including FIGS. 4(a) and 4(b) illustrates another example of a superframe structure according to an exemplary embodiment of the present invention.

Referring to FIG. 4(a), an SFH may include a BCH and a DL-SCH. The DL-SCH, however, may be omitted according to capacity of the BCH.

The BCH may include an NTI field, paging information (PI) field, and other information. The NTI field may include a topology information message indicator (or, other RAT information flag) field indicating whether inter-RAT information is included in a prescribed superframe and an SFN field indicating a start position of a frame (or, a sub-frame) to which a topology information message (e.g. AAI_ORAT-MSG or AAI_ORAT-ADV) is allocated.

Referring to FIG. 4(b), an SFH may include a PBCH, an SBCH, and a DL-SCH. The DL-SCH, however, may be omitted according to capacity of a BCH.

FIG. 4(b) shows the PBCH including NTI, PI, and other information, unlike FIG. 3. The NTI may include a topology information indicator field indicating whether inter-RAT information is included in a prescribed superframe and an SFN field indicating a start position of a frame (or, a sub-frame) to which a topology information message is allocated.

Referring to FIGS. 3, 4(a), and 4(b), a BS may additionally transmit parameters for supporting inter-RAT handover to an MS. In more detail, the BS may transmit various parameters necessary for handover (e.g., intra-RAT handover or inter-RAT handover) and scanning to the MS through the BCH. The BS may use the PBCH or the SBCH to transmit the parameters for supporting the inter-RAT handover to the MS. In the exemplary embodiments of the present invention, a case where the BS transmits the parameters using the SBCH is described by way of example.

The BS may transmit the parameters for supporting the inter-RAT handover to the MS in the form of being included in the SBCH. Parameters related to handover and scanning, which may be included in the SBCH, are as follows.

TABLE 1

| Name | Length | Value |
|---|---|---|
| Handover Trigger TLV | — | — |
| Scanning Trigger TLV | — | — |
| Pre-registration Trigger TLV | — | — |
| Neighbor Advertisement Message Indication | — | — |
| Intra-RAT scanning & Handover Threshold | — | — |
| Inter-RAT Scanning & Handover Threshold | — | — |
| Inter-RAT Pre-registration Threshold | — | — |
| Handover Threshold | — | — |
| Supported HO Type | — | — |
| Other RAT Pre-registration Capability Indication | — | — |

Referring to Table 1, the parameters for supporting inter-RAT handover include a handover trigger TLV field, a scanning trigger TLV field, a pre-registration trigger TLV field, an NBR-ADV message indication field, an intra-RAT scanning and handover threshold field, an inter-RAT scanning and handover threshold field, an inter-RAT pre-registration threshold field, a handover threshold field, an other RAT pre-registration capability indication field and a supported handover type field.

The following Table 2 shows functions and actions of the handover trigger TLV field, scanning trigger TLV field, and pre-registration trigger TLV field.

TABLE 2

| Name | Length | Value |
|---|---|---|
| Type | — | |
| Function | — | Computation defining trigger condition:<br>0x0: Reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5: Metric of serving BS greater than absolute value<br>0x6: Metric of serving BS less than absolute value |
| Action | — | Action performed upon reaching trigger condition:<br>0x0: Reserved<br>0x1: Respond on trigger with MOB_SCN-REQ after the end of each scanning interval<br>0x2: Respond on trigger with MOB_MSHO-REQ<br>0x3: On trigger, MS starts neighbor BS scanning process by sending MOB_SCN-REQ, by initiating autonomous neighbor cell scanning or both<br>0x4: On trigger, MS starts Inter RAT neighbor BS scanning process by sending MOB_SCN-REQ<br>0x5: On trigger, MS starts Inter-RAT handover by sending MOB_MSHO-REQ<br>0x6: On trigger, MS starts Inter-RAT Pre-registration process by sending MOB_SCN-REQ<br>0x7: Reserved |

The BS may transmit the SBCH including the contents of Table 2 to the MS. Therefore, if the MS satisfies a trigger condition of Table 2, scanning, pre-registration, or handover can be performed.

Referring back to Table 1, the NBR-ADV message indication field indicates whether an NBR-ADV message is transmitted to the MS at a corresponding superframe period of 20 ms. The intra-RAT scanning and handover threshold field denotes a reference value for determining whether the MS satisfies a scanning or handover trigger condition. The inter-RAT scanning and handover threshold field, the inter-RAT pre-registration threshold field, and the handover threshold field denote reference values for determining whether the MS satisfies scanning, pre-registration, and handover trigger conditions, respectively.

The other RAT pre-registration capability indication field indicates whether to support pre-registration capabilities for other RAT networks. If pre-registration to other RAT networks is necessary, the MS may scan only a network supporting pre-registration capabilities. This field may be contained in a message, including other RAT information, other than an SBCH and may then be transmitted to the MS (e.g., may be broadcast through a predetermined DL subframe in the form of a message including the other RAT information, similar to an MOB_NBR-ADV message). The BS may broadcast the other Rat pre-registration capability indication field in message form. In this case, the BS may transmit both intra-RAT neighbor BS information and inter-RAT neighbor BS information. Alternatively, the BS may separately transmit the intra-RAT neighbor BS information and the inter-RAT neighbor BS information using different SBCHs.

The supported handover type field indicates a handover type supported by the BS.

The fields and contents of Tables 1 and 2 may be transmitted through the SBCH shown in FIGS. 3 and 4. However, the BS may transmit the contents of Tables 1 and 2 through the PBCH according to a user request or channel environment. The inter-RAT NBR-ADV message including the contents of Tables 1 and 2 may be previously transmitted to the MS through a DL subframe designated in a broadcast message form in order to transmit neighbor BS information.

Figure 5:
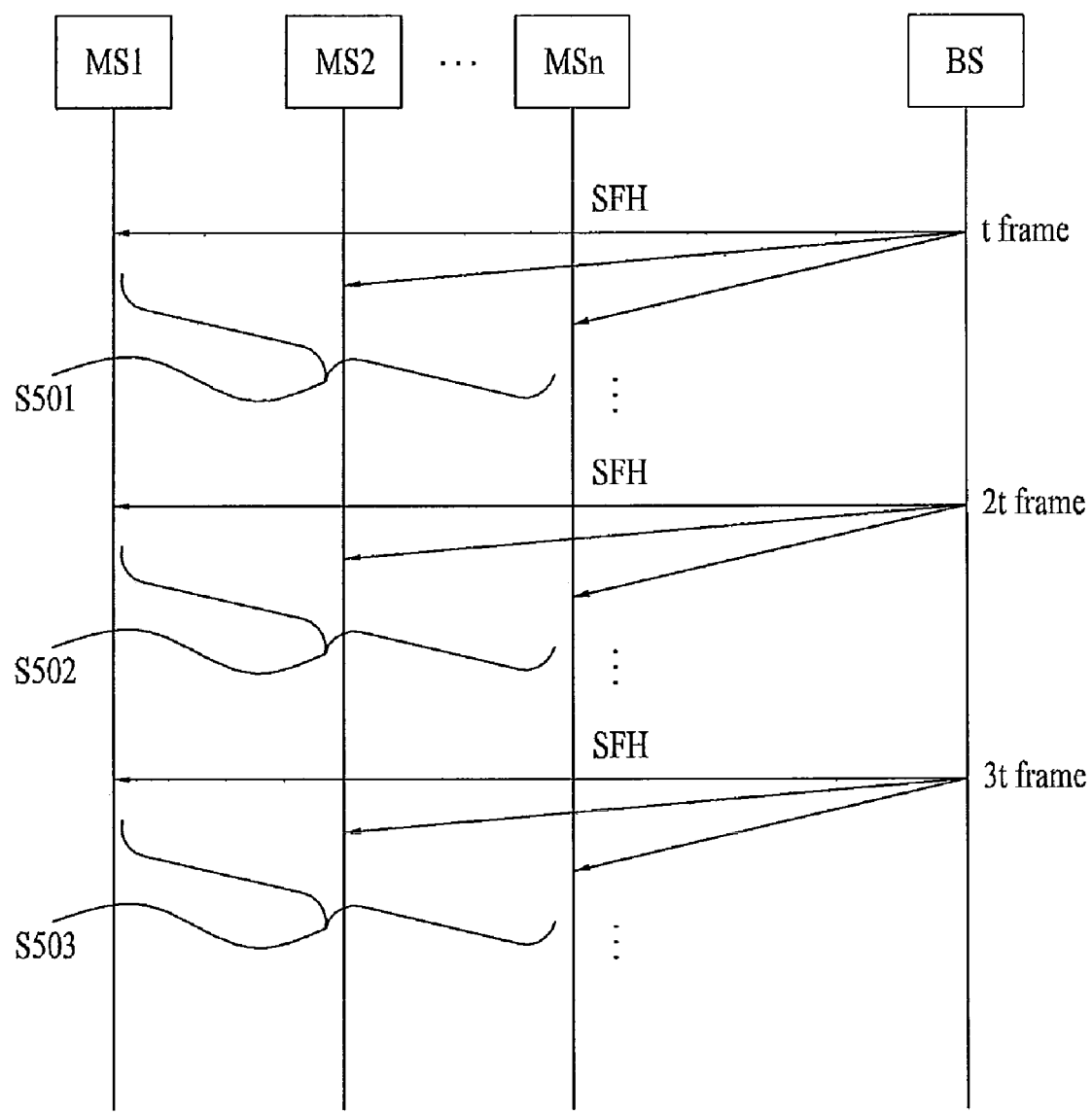
FIG. 5 illustrates a method for broadcasting an SFH according to another exemplary embodiment of the present invention.

FIG. 5 illustrates a method for broadcasting an SFH according to another exemplary embodiment of the present invention.

To support inter-RAT handover, a method for a BS to transmit an SFH including inter-RAT information is shown in FIG. 5. Referring to FIG. 5, a BS may periodically broadcast an SFH to one or more MSs (MS1, MS2, . . . , MSn) (steps S501, S502, and S503).

In this case, the BS may broadcast the SFH transmitted in steps S501, S502, and S503 to one or more MSs using the SFH structure described in conjunction with FIGS. 3, 4(*a*) and 4(*b*). Namely, in FIG. 5, the BS may set an indicator (e.g., an NTII or other RAT information flag) indicating whether inter-RAT information is transmitted in a current superframe and may transmit the indicator to the MSs through a BCH. If the NTII is set, the BS may directly broadcast the inter-RAT information to one or more MSs or may inform the MS of information (e.g. SFN) about a transmitted frame. If the mobile station receives the inter-RAT information, the mobile station is able to scan the other RAT base station.

Figure 6:
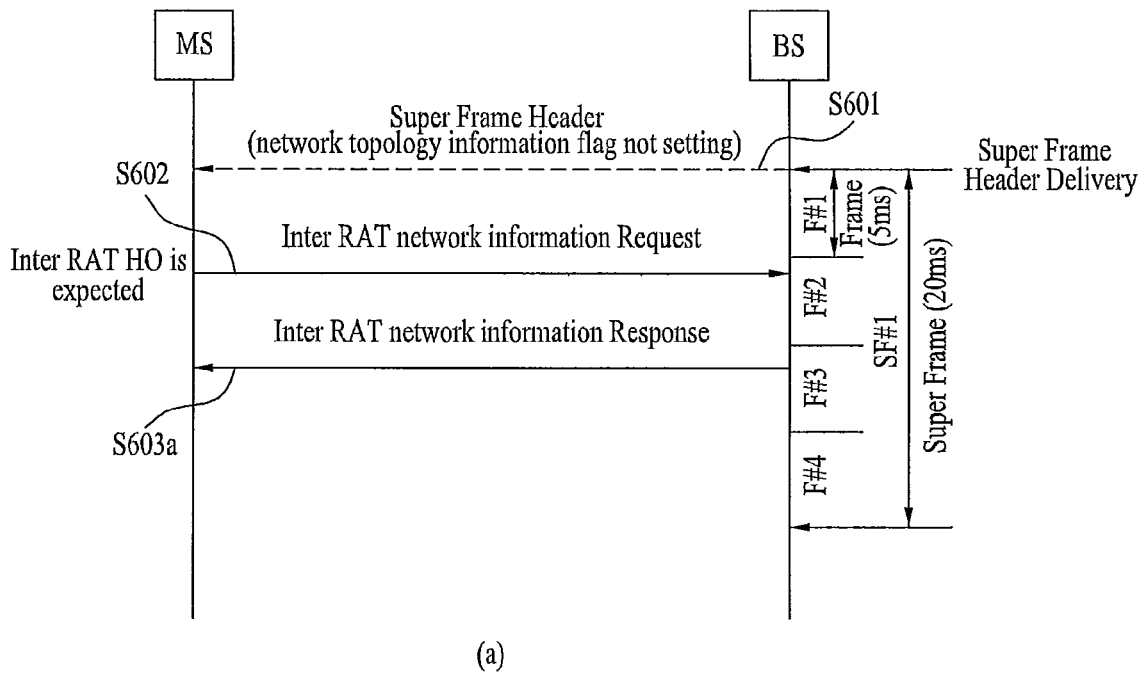
FIG. 6 including FIGS. 6(*a*) and 6(*b*) illustrates an example of a method for transmitting inter-RAT information according to another exemplary embodiment of the present invention.
Figure 6:
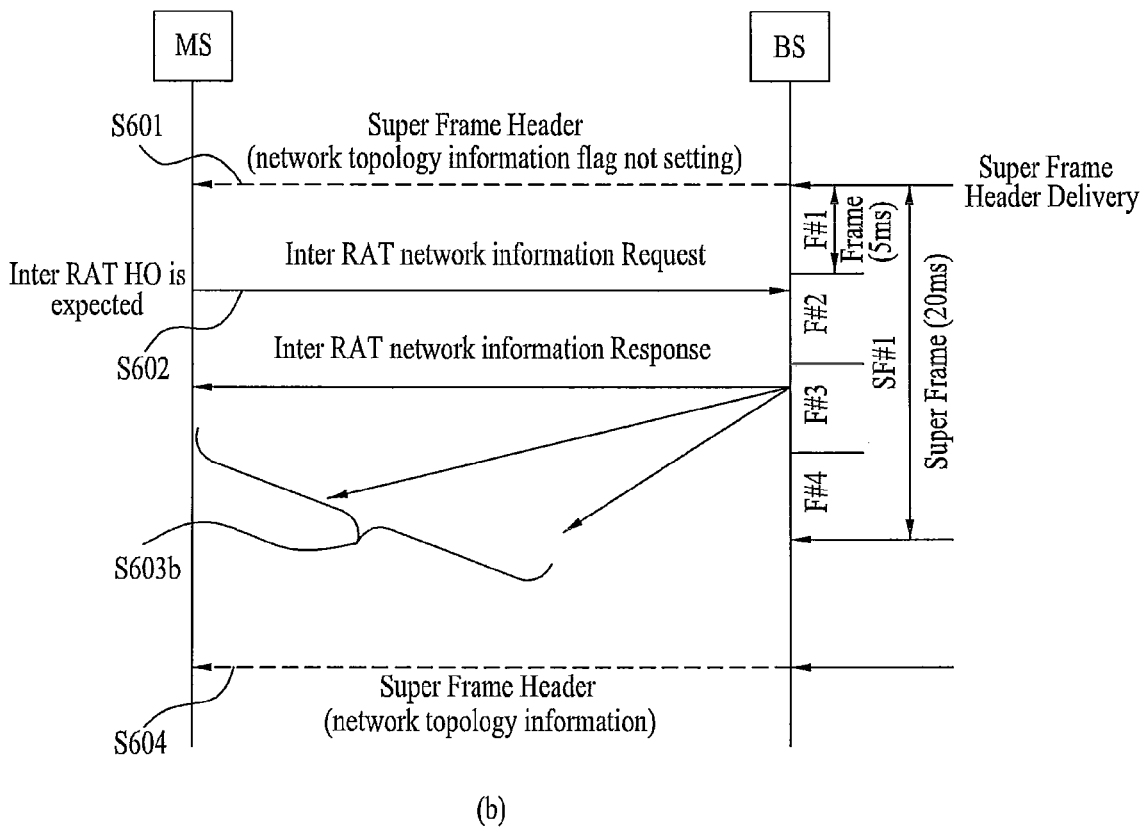

FIG. 6 including 6(*a*) and 6(*b*) illustrate an example of a method for transmitting inter-RAT information according to another exemplary embodiment of the present invention.

In FIGS. 6(*a*) and 6(*b*), an MS requests a BS to transmit inter-RAT information and the BS transmits the inter-RAT information to the MS. It is assumed that the BS has already known the inter-RAT information. Upon performing network entry to a current BS, the MS may negotiate mutual capability as to whether it can acquire inter-RAT information supported by the current BS.

Referring to FIG. 6(*a*), a BS may transmit an SFH to an MS every predefined period. The SFH may be transmitted in a specific superframe. The SFH may be transmitted every superframe according to a channel environment. In the exemplary embodiment of the present invention, the predefined period may be a time period corresponding to a superframe. Accordingly, when the superframe structure of FIGS. 2 and 3, the BS may transmit the SFH to the MS at a period of 20 ms (step S601).

In step S601, an NTII indicating that inter-information is transmitted in a corresponding superframe may be included in an SBCH of the SFH. The NTII may be called a topology information message indicator, an other RAT information flag, or a network topology information flag.

Setting of the NTII means that inter-RAT information is transmitted in a corresponding superframe to the MS. Non-setting of the NTII means that inter-RAT information necessary for inter-RAT handover is not transmitted in a corresponding superframe. In FIG. 6, it is assumed that the BS has already included inter-RAT information but the NTII has not been set.

To acquire inter-RAT information, the MS may transmit an inter-RAT network information request message to the BS (step S602).

Even though the MS receives abbreviated information such as inter-RAT BS IDs through step S601, if the MS requires detailed information about inter-RAT BSs, step S602 may be carried out.

Further, step S602 may be performed when the MS desires to hand over to an inter-RAT network. For example, step S602 may be performed when an intra-RAT BS to which the MS can hand over is not present or when the MS confirms whether other RAT networks which are lower in cost than a currently connected network by handover policy are present.

The BS may transmit, to the MS, an inter-RAT network information response message including information about an inter-RAT network in which handover can be performed among neighbor inter-RAT networks, in response to the inter-RAT network information request message of the MS (step S603*a*).

Steps S601 and S602 of FIG. 6(*b*) are the same as those of FIG. 6(*a*). Step S603*b* of FIG. 6(*b*), however, indicates that the BS broadcasts an inter-RAT network information response message to one or more MSs, unlike step S603*a* of FIG. 6(*a*). In this case, steps S601 to S603*a* or S603*b* may be performed in the same superframe.

If the BS does not transmit the inter-RAT network information response message in a corresponding superframe, the BS may broadcast inter-RAT network information to the MSs using a next SFH (step S604).

The inter-RAT information may be included in a BCH of the SFH, for example, in either a PBCH or an SBCH of the BCH. If there is a large quantity of inter-RAT information, the BS may transmit an indicator indicating that inter-RAT information is to be transmitted in a specific subframe within a current superframe to the MS through the SBCH. Alternatively, the BS may transmit, to the MS, a pointer indicating in which part of a superframe the inter-RAT information is to be actually transmitted. The BS may transmit the inter-RAT information to the MS in a subframe indicated by the indicator or the pointer.

Figure 7:
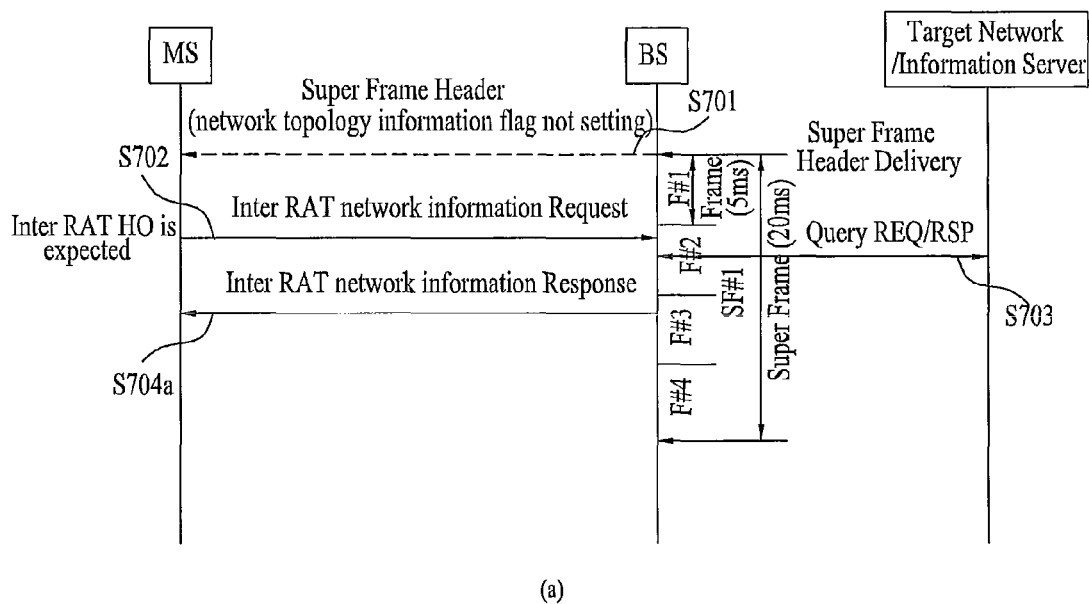
FIG. 7 including FIGS. 7(*a*) and 7(*b*) illustrates another example of a method for transmitting inter-RAT information according to another exemplary embodiment of the present invention.
Figure 7:
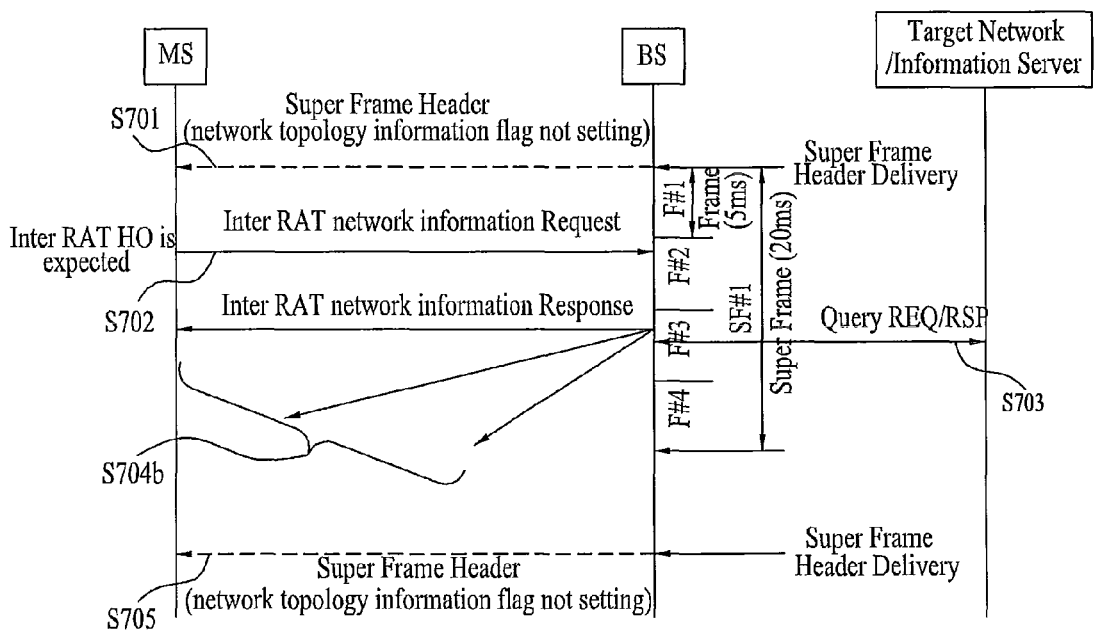

FIG. 7 including FIGS. 7(*a*) and 7(*b*) illustrate another example of a method for transmitting inter-RAT information according to another exemplary embodiment of the present invention.

Unlike FIGS. 6(*a*) and 6(*b*), FIGS. 7(*a*) and 7(*b*) illustrate a method for transmitting inter-RAT information when a BS is not aware of the inter-RAT information. Upon performing network entry to a current BS, an MS may negotiate mutual capability as to whether it can acquire the inter-RAT information supported by the current BS.

Referring to FIG. 7(a), a BS may transmit an SFH which does not include network topology information to an MS every predefined period (step S701).

In step S701, the BS may transmit the SFH in a specific superframe. The SFH may be transmitted every superframe according to a channel environment. In the embodiment of the present invention, the predefined period may be a time period corresponding to a superframe. Accordingly, when using the superframe structure of FIGS. 2 and 3, the BS may transmit the SFH to the MS at a period of 20 ms.

If the MS does not acquire the topology information including the inter-RAT information through the SFH, the MS may transmit an inter-RAT network information request message requesting the inter-RAT information to the BS (step S702).

Step 702 may also be performed when the MS should perform inter-RAT handover, for example, when an intra-RAT BS to which the MS can hand over is not present or when the MS desires to search other RAT networks which are lower in cost than a currently connected network by handover policy.

Even though the MS receives abbreviated information such as neighbor inter-RAT BS IDs through step S701, if the MS requires detailed information about inter-RAT BSs, step S702 may be carried out.

A current serving BS does not include the inter-RAT information. Therefore, the serving BS may transmit a query request (Query-REQ) message requesting the inter-RAT information to a target network information server (or another network entity) having the inter-RAT information and may acquire the inter-RAT information by receiving a query response (Query-RSP) message from the target network information server (step S703).

Upon acquiring the inter-RAT information from the target network information server, the BS may transmit an inter-RAT network information response message including the inter-RAT information to the MS (step S704a).

Steps S701 to S703 of FIG. 7(b) are the same as those of FIG. 7(a). Step 704b of FIG. 7(b), however, indicates that the BS broadcasts an inter-RAT network information response message to one or more MSs, unlike step S704a of FIG. 7(a). In this case, steps S701 to S704a or S704b may be performed in the same superframe.

If the BS does not transmit the inter-RAT network information response message in a corresponding superframe, the BS may broadcast the inter-RAT information to the MSs using a next SFH (step S705).

In FIGS. 7(a) and 7(b), the inter-RAT information may be included in a BCH of an SFH, for example, in either a PBCH or an SBCH of the BCH. If there is a large quantity of inter-RAT information, the BS may transmit an indicator indicating that the inter-RAT information is to be transmitted in a specific subframe within a current superframe to the MS through the SBCH. In addition, the BS may transmit, to the MS, a pointer indicating in which part of a superframe the inter-RAT information is to be actually transmitted. The BS may transmit the inter-RAT information to the MS in a subframe indicated by the indicator or the pointer.

The SFH used in steps S604 and step S705 may have the same structure as the SFH used in FIG. 5.

Figure 8:
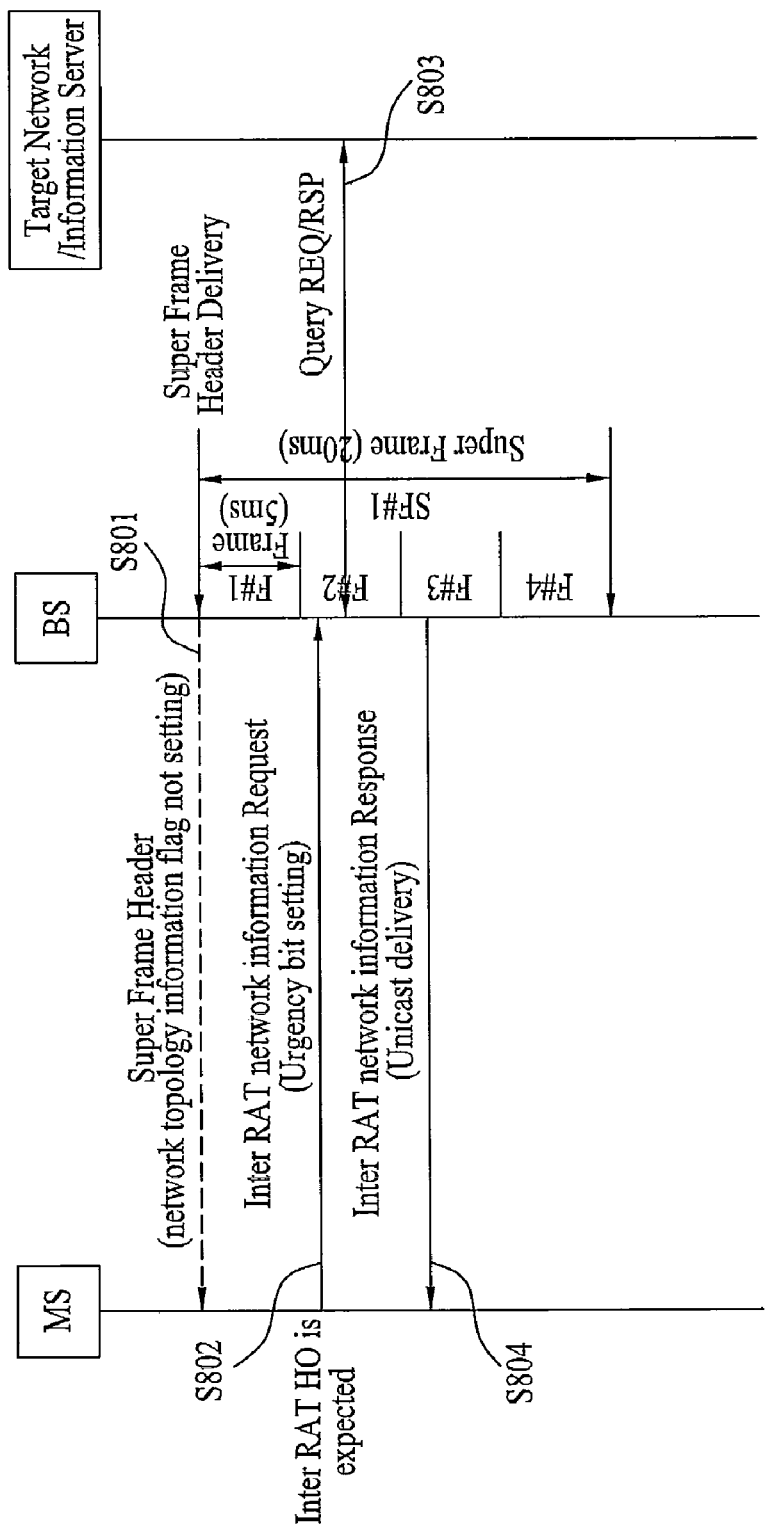
FIG. 8 illustrates another example of a method for transmitting inter-RAT information according to another exemplary embodiment of the present invention.

FIG. 8 illustrates another example of a method for transmitting inter-RAT information according to another exemplary embodiment of the present invention.

FIG. 8 illustrates a method for acquiring inter-RAT information when acquisition of the inter-RAT information is urgent. Operation of FIG. 8 is basically similar to that of FIG. 7(a). Therefore, steps S802 and S804, which are different from steps of FIG. 7(a) will mainly be described to omit repetitive description.

An MS may receive an SFH which does not include inter-RAT information from a BS (step S801). If the MS needs to urgently perform inter-RAT handover, the MS may inform the BS that inter-RAT information is urgently required by setting an urgent information field (e.g., an urgent bit) included in an inter-RAT network information request message to '1' (step S802).

Accordingly, the BS acquires the inter-RAT information from a target network information server (step S803) and immediately may transmit the inter-RAT information to the MS setting the urgent bit in a unicast format (step S804).

If the BS includes the inter-RAT information, the BS may immediately transmit the inter-RAT information to a corresponding MS without communicating with another network entity. The urgent bit denotes an identifier indicating that inter-RAT information should rapidly be transmitted and may be interpreted as a unicast transmission request.

In FIG. 8, the urgent information field or urgent bit may be indicated by one or more bits according to a user request or channel environment. For example, the BS may use an urgent bit that is 2 or 3 bits in size.

Figure 9:
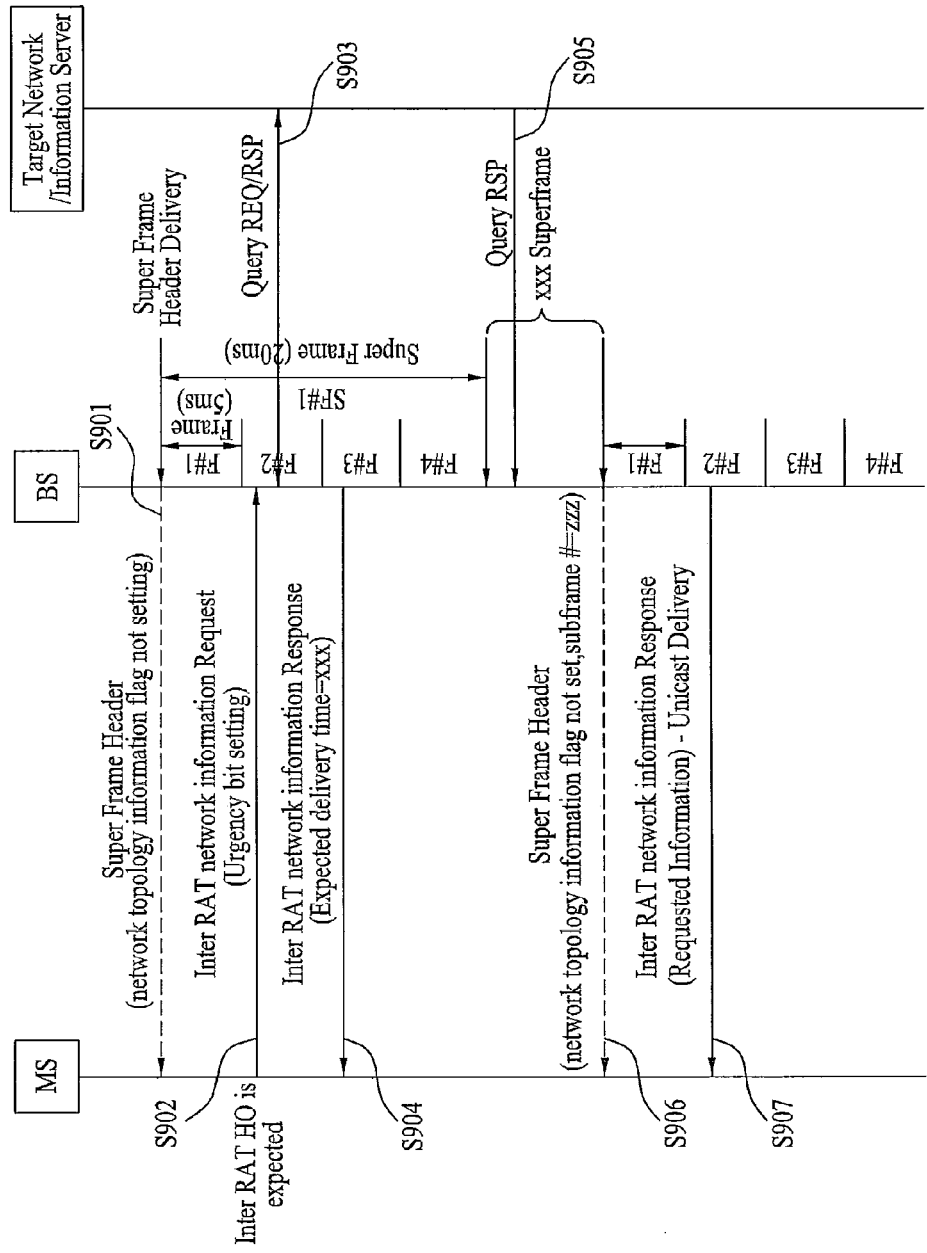
FIG. 9 illustrates another example of a method for transmitting inter-RAT information according to another exemplary embodiment of the present invention.

FIG. 9 illustrates another example of a method for transmitting inter-RAT information according to another exemplary embodiment of the present invention.

Operation of FIG. 9 is basically similar to that of FIG. 8. However, FIG. 9 illustrates a method for informing an MS of an estimated time at which inter-RAT information is to be transmitted, when a BS does not acquire the inter-RAT information even though the MS transmits the inter-RAT information to the BS by setting an urgent bit.

Steps S901 and S902 of FIG. 9 are similar to steps S801 and S802 of FIG. 8. However, FIG. 9 illustrates the case where a BS does not acquire inter-RAT information from a target network information server although the BS transmits a query request message for requesting the inter-RAT information to the target network information server (step S903).

Then the BS may inform an MS of an estimated time at which an inter-RAT network information response message is to be delivered through a unicast response message (e.g., an inter-RAT network information response message). That is, the BS may inform the MS of a delivery time of the inter-RAT information using an expected time (xxx) field (step S904).

In step S904, the BS may inform the MS of a superframe number in which the inter-RAT network information response message is to be transmitted, or offset values of a current superframe and a superframe in which the inter-RAT information is to be transmitted, using the expected delivery time field. Further, the BS may inform the MS in which subframe of a specific superframe the inter-RAT information is transmitted using the expected delivery time field.

In step S904, the MS receiving a response message including the expected delivery time field may scan other RAT networks or may operate in an idle mode (or a sleep mode) to reduce power consumption, while waiting for the inter-RAT information.

The BS may receive a query response message including the inter-RAT information from the target network information server during a time period indicated by the estimated delivery time field (step S905).

The BS may transmit a response message or an SFH, including the inter-RAT information in a superframe or a subframe indicated by the expected delivery time field, to the MS. In this case, information indicating whether the inter-RAT information is included may be contained in a BCH of the SFH (step S906).

In step S906, the inter-RAT information may not be used even at a time point indicated by the expected delivery time field. In this case, the BS may again inform the MS of an expected delivery time (subframe#=zzz) at which the inter-RAT information is to be delivered through a BCH transmitted at a start part of a superframe or through a response message transmitted in unicast form.

The BS may transmit an inter-RAT network information response message to the MS at the expected delivery time (zzz) (step S907).

Another method for the BS to inform the MS of the expected delivery time in step S904 will be described. The BS may use a counter to inform the MS of the expected delivery time.

For example, the BS transmits the response message including the expected delivery time field to the MS in steps S904 and thereafter reduces a counter value whenever transmitting a BCH of each superframe. If the counter value reaches 0, the BS may transmit the inter-RAT information to the MS. Alternatively, the BS may increase the counter value whenever transmitting the BCH and may transmit the inter-RAT information when the counter value reaches a threshold value. In this case, the BS may transmit the inter-RAT network information response message to the MS in unicast form.

If the BS does not transmit the inter-RAT information to the MS even though the counter value reaches the threshold value or 0, the BS may reset the expected delivery time field and may transmit it to the MS.

Figure 10:
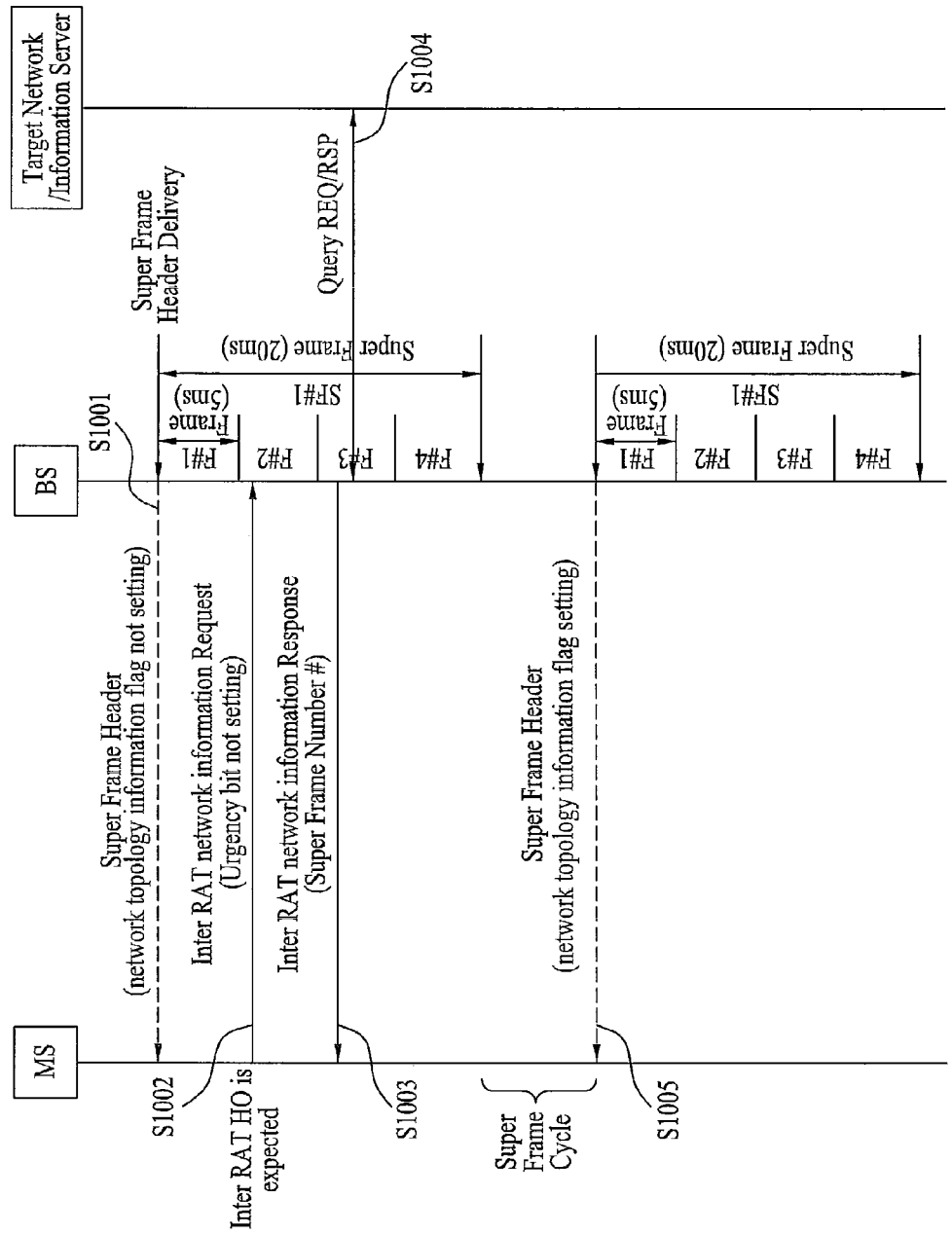
FIG. 10 illustrates another example of a method for transmitting inter-RAT information according to another exemplary embodiment of the present invention.

FIG. 10 illustrates another example of a method for transmitting inter-RAT information according to another exemplary embodiment of the present invention.

FIG. 10 illustrates a method for a BS to transmit inter-RAT information when acquisition of the inter-RAT information is not urgent. Referring to FIG. 10, a BS may transmit, to an MS at a predefined period, an SFH which does not include NTI, that is, an SFH in which an NTII is not set (step S1001).

In step S1001, the BS may transmit the SFH in a specific superframe. The SFH may be transmitted every superframe according to a channel environment. In the embodiment of the present invention, the predefined period may be a time period corresponding to a superframe. Accordingly, when using the superframe structure of FIGS. 2 and 3, the BS may transmit the SFH to the MS at a period of 20 ms.

The MS may indicate a non-urgent state by setting an urgent information field (e.g., an urgent bit) included in an inter-RAT network information request message to '0' (step S1002).

The BS may determine urgency of inter-RAT information by confirming the urgent information field included in the inter-RAT network information request message and may determine a delivery time of corresponding inter-RAT information. Accordingly, the BS may transmit a response message including information about the delivery time of corresponding inter-RAT information, e.g., about a superframe number in which the inter-RAT information is to be transmitted (step S1003).

If the BS does not include the inter-RAT information, the BS may acquire the inter-RAT information used in a target network information server by requesting the target network information server to transmit the inter-RAT information (step S1004). If the BS includes the inter-RAT information, step S1004 may be omitted.

In FIG. 10, the inter-RAT information may be included in a BCH of an SFH, for example, in either a PBCH or an SBCH of the BCH. If there is a large quantity of inter-RAT information, the BS may transmit an indicator indicating that inter-RAT information is to be transmitted in a specific subframe within a current superframe to the MS through the SBCH. Alternatively, the BS may transmit, to the MS, a pointer indicating in which part of a superframe the inter-RAT information is actually transmitted. The BS may transmit inter-RAT information to the MS in a subframe indicated by the indicator or the pointer.

When transmitting the inter-RAT network information response message to the MS, the BS may transmit the inter-RAT network information response message together with the inter-RAT network information request message to MSs in consideration of other MSs which do not request the inter-RAT information.

If the BS is not ready to transmit the inter-RAT information to the MS at an expected delivery time of the inter-RAT information, the BS may again transmit the expected delivery time of the inter-RAT information to the MS using a BCH or a broadcast message through which additional information is transmitted.

Figure 11:
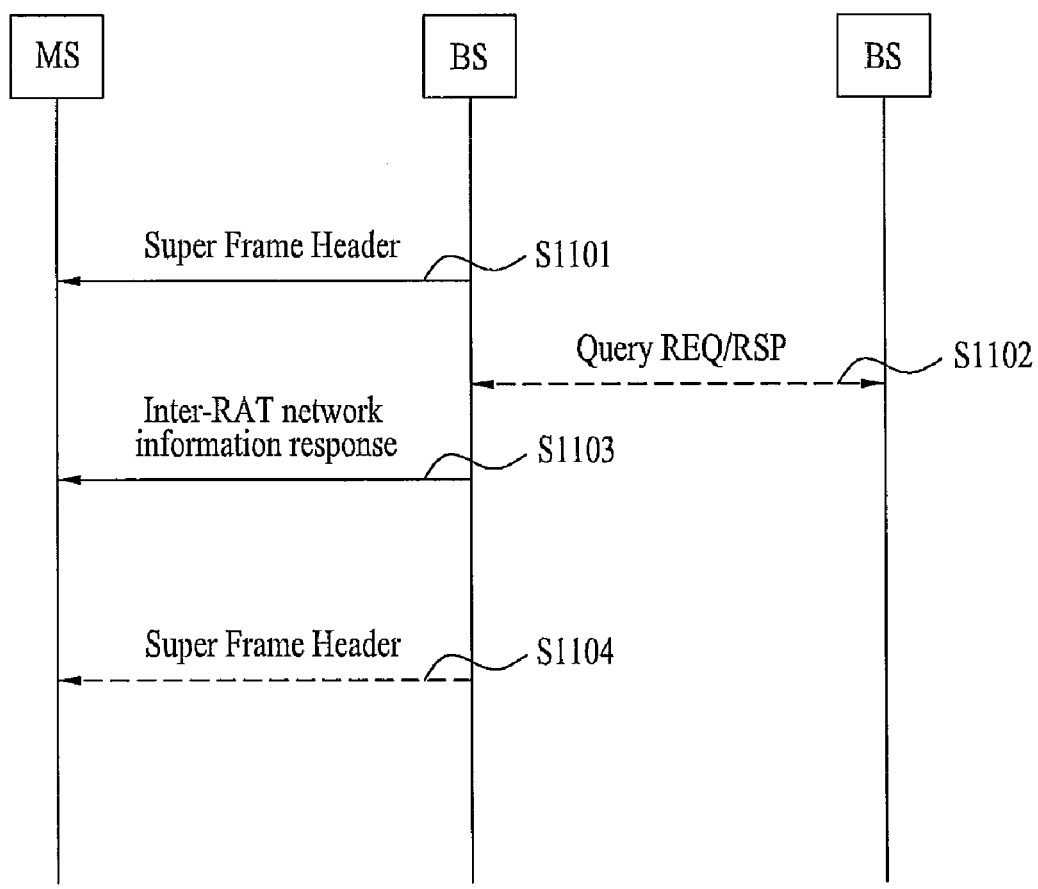
FIG. 11 illustrates a method for a BS to arbitrarily transmit inter-RAT information to an MS according to another exemplary embodiment of the present invention.

FIG. 11 illustrates a method for a BS to arbitrarily transmit inter-RAT information to an MS according to another exemplary embodiment of the present invention.

In FIG. 11, a method for transmitting unsolicited inter-RAT information is illustrated. Referring to FIG. 11, a BS may transmit an SFH which does not include NTI every predefined period (step S1101).

A serving BS does not include inter-RAT information. Accordingly, the serving BS transmits a query request message for requesting the inter-RAT information to a target network information server (or another network entity) having the inter-RAT information and may receive a query response message from the target network information server, thereby acquiring the inter-RAT information (step S1102).

Upon acquiring the inter-RAT information from the target network information server even though the BS does not request the inter-RAT information, the BS may arbitrarily transmit the inter-RAT information to the MS (step S1103).

In step S1103, the BS may transmit an inter-RAT information network response message including the inter-RAT information to a specific MS in a unicast form or may transmit the inter-RAT network information response message to one or more MSs in broadcast form.

If the BS does not transmit the inter-RAT network information response message within a corresponding superframe to the MS, the BS may broadcast the inter-RAT information to MSs using a next SFH (step S1104).

Hereinafter, a method will be described for transmitting inter-RAT information using a topology according to another exemplary embodiment of the present invention.

In FIGS. 6 to 11, the inter-RAT network information request message may be changed to an AAI_PKM-REQ message, and the inter-RAT network information response message may be changed to an AAI_PKM-RSP message.

In the exemplary embodiments of the present invention, which will be described hereinbelow, a network topology information message indicator (NTIMI) may indicate whether a network topology information message is included in a current superframe (or a specific superframe). Namely, the NTIMI may perform the same function as the above-described NTII and the other RAT information flag. An SFN field may indicate a start frame number in which a network topology information message is transmitted.

Figure 12:
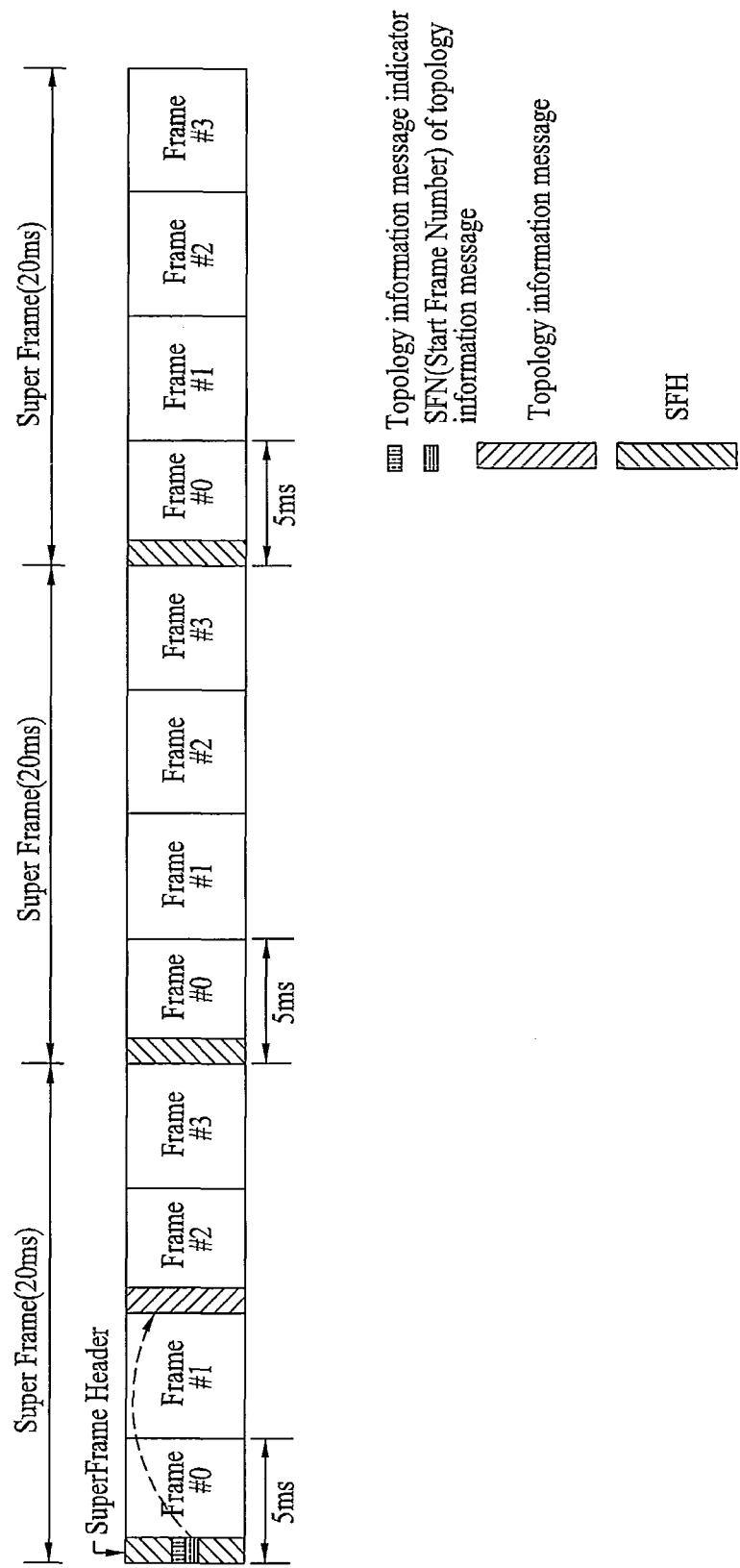
FIG. 12 illustrates an example of a method for transmitting inter-RAT information using an NTIMI according to another exemplary embodiment of the present invention.

FIG. 12 illustrates an example of a method for transmitting inter-RAT information using an NTIMI according to another exemplary embodiment of the present invention.

Referring to FIG. 12, an NTIMI included in an SFH may indicate whether a topology information message including inter-RAT information is transmitted within a current superframe. In FIG. 12, the NTIMI is set to '1' indicating that the network topology information message is transmitted in a current superframe.

An MS may be aware of presence of the topology information message within the current superframe by decoding the NTIMI. Therefore, the MS may know a frame number in which the topology information message is actually present by decoding an SFN field. The MS may decode the topology information message in a frame (or a subframe) indicated by the SFN field.

In the exemplary embodiments of the present invention, a BS may transmit the network topology information message to the MS within a subframe of a specific frame where the SFN field indicates. In other words, the BS may indicate a frame (or a subframe) in which the network topology information message is transmitted using the SFN field. The SFN may indicate a specific frame (or a subframe) number.

Figure 13:
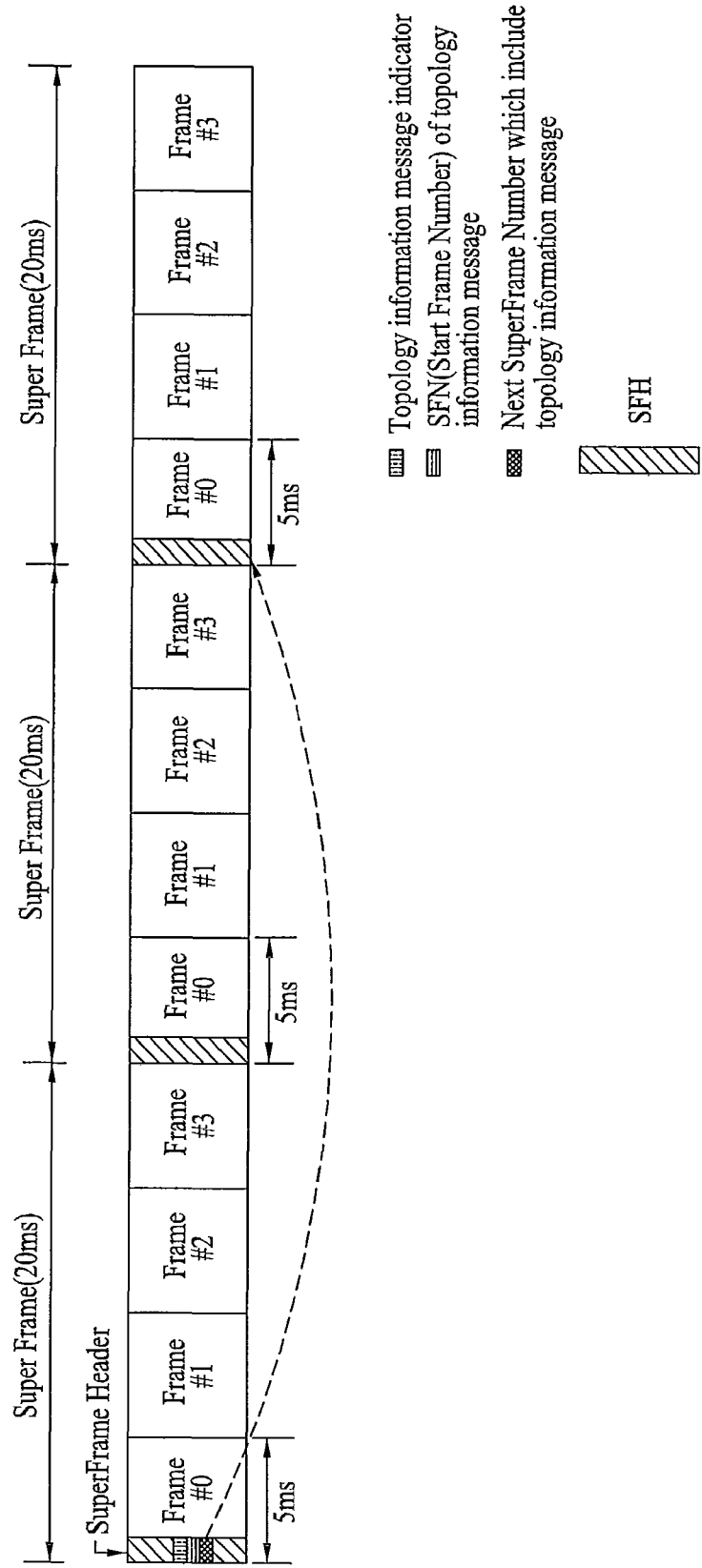
FIG. 13 illustrates another example of a method for transmitting inter-RAT information using an NTIMI according to another exemplary embodiment of the present invention.

FIG. 13 illustrates another example of a method for transmitting inter-RAT information using an NTIMI according to another exemplary embodiment of the present invention.

FIG. 13 is basically identical to FIG. 12 except that an NTIMI is '0' indicating a network topology information message is not transmitted in a current superframe. In this case, an MS may not decode an SFN field. The MS may decode a next superframe number field included in an SFH. The next superframe number field frame may indicate a next superframe number including network topology information. Accordingly, the MS may decode the network topology information message in a superframe indicated by the next superframe number field by decoding the next superframe number field.

Figure 14:
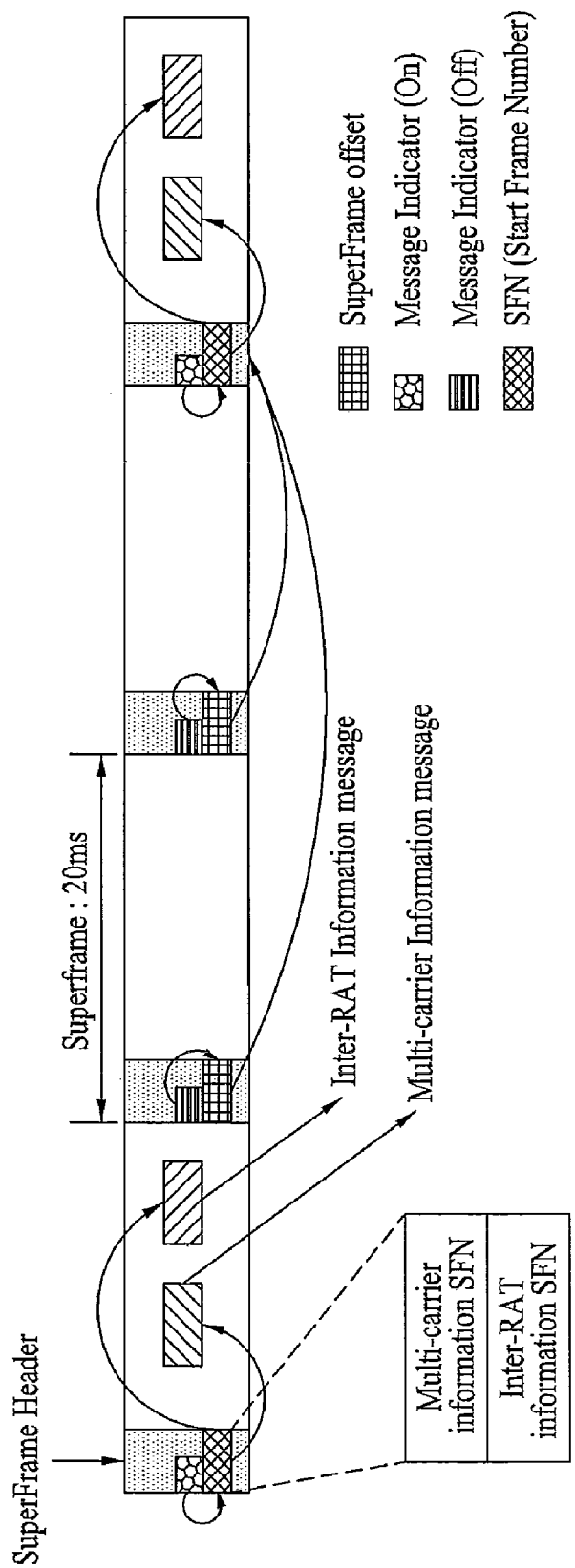
FIG. 14 illustrates another example of a method for transmitting inter-RAT information using an NTIMI according to another exemplary embodiment of the present invention.

FIG. 14 illustrates another example of a method for transmitting multi-RAT information using an NTIMI according to another exemplary embodiment of the present invention.

In FIG. 14, a BS may transmit, to an MS, an SFH including an NTIMI (hereinafter, referred to as a message indicator) and an SFN field. A network topology information message may include a multi-carrier information message and an inter-RAT information message.

The SFH may further include a multi-carrier information SFN field indicating a frame number in which the multi-carrier information message is transmitted and a inter-RAT information SFN field indicating a frame number in which the inter-RAT information message is transmitted. The multi-carrier information SFN field and the inter-RAT information SFN field may be included in an SFN field.

Referring to FIG. 14, the BS may transmit the SFH including the message indicator and the SFN field in the first superframe to the MS. It is assumed that the message indicator is set to '1'.

If the message indicator denotes '1', the MS may decode the SFN field. Therefore, the MS may decode the multi-carrier information message in a frame (or a subframe) indicated by the multi-carrier information SFN field in the SFN field. The MS may also decode the inter-RAT information message in a frame (or a subframe) indicated by the inter-RAT information SFN field.

The BS may transmit, to the MS, an SFH including a message indicator and a superframe offset field in the second and third superframes. It is assumed that the message indicator is set to '0' (off).

Upon decoding the message indicator, the MS may recognize that a network topology information message is not transmitted in a current superframe. Therefore, the MS may decode the superframe offset field indicating a superframe number in which the network topology information message is transmitted and may receive the network topology information message in a superframe indicated by the superframe offset field.

Figure 15:
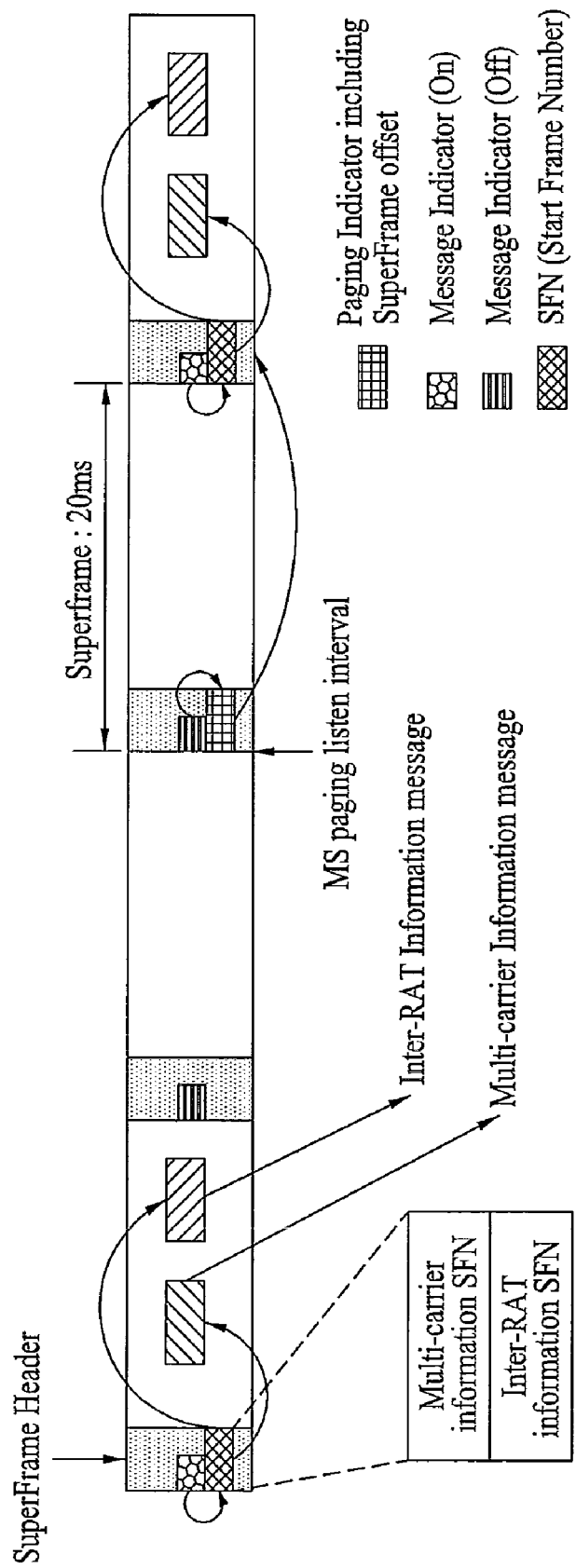
FIG. 15 illustrates an example of a method for transmitting inter-RAT information using an NTIMI of an idle-mode state according to another exemplary embodiment of the present invention.

FIG. 15 illustrates an example of a method for transmitting multi-RAT information using an NTIMI of an idle-mode state according to another exemplary embodiment of the present invention.

FIG. 15 is basically similar to FIG. 14. In FIG. 15, it is assumed that an MS is in an idle mode. The MS may decode an SFH by escaping from a paging listen interval allocated thereto in the idle mode.

If a message indicator included in the SFH is '0' (off), a BS may transmit, to the MS, a paging indicator field including a superframe offset field indicating a superframe number in which a network topology information message is transmitted.

The MS may decode an SFH of a superframe indicated by the superframe offset field by confirming the superframe offset field. Accordingly, the MS may decode the network topology information message in a corresponding superframe.

Figure 16:
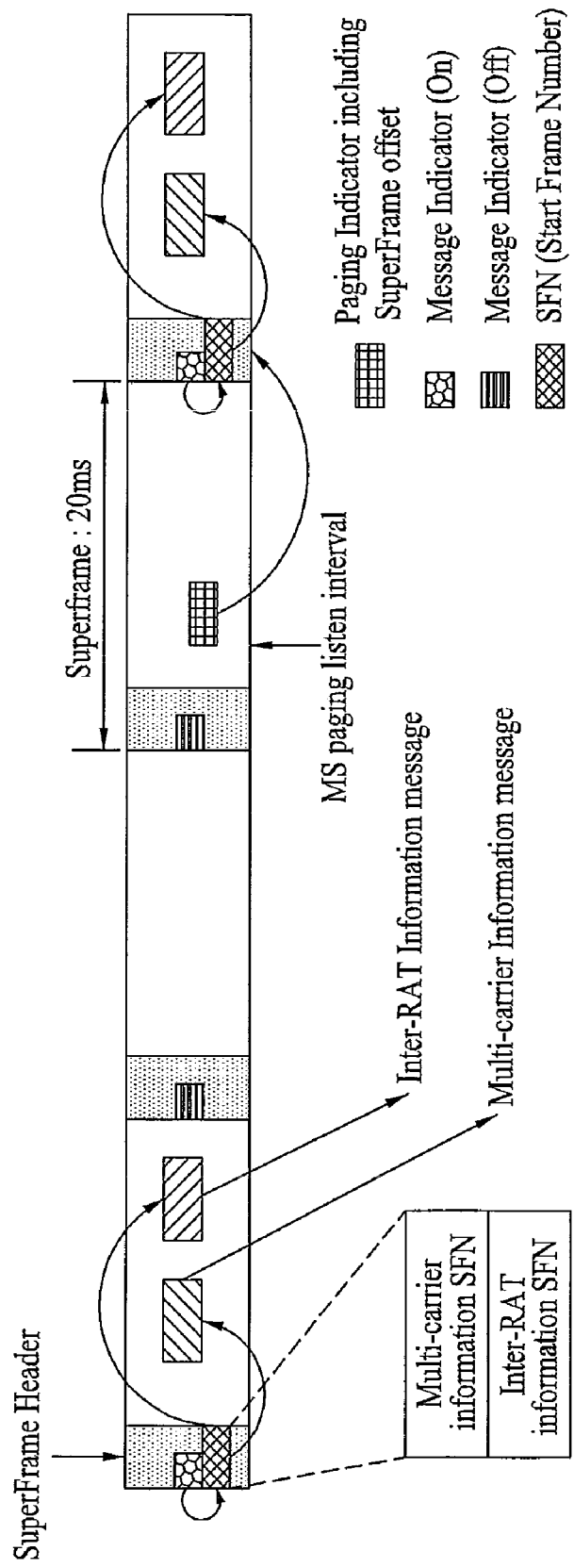
FIG. 16 illustrates another example of a method for transmitting inter-RAT information using an NTIMI of an idle-mode state according to another exemplary embodiment of the present invention.

FIG. 16 illustrates another example of a method for transmitting multi-RAT information using an NTIMI of an idle-mode state according to another exemplary embodiment of the present invention.

FIG. 16 is basically similar to FIG. 15. However, in FIG. 16, a superframe offset field is not included in an SFH and is transmitted in a map message or a preset position (e.g., a specific frame or specific subframe). It is assumed that a position at which a superframe offset is transmitted is already known by an MS and a BS. The superframe offset may be included in a specific frame header or a subframe header.

Referring to FIG. 16, the MS may decode messages transmitted by the BS by escaping from a paging listen interval allocated thereto. In FIG. 16, the MS may decode the superframe offset by escaping the paging listen interval. The MS may decode a network topology information message (e.g., a multimedia carrier information message and/or a inter-RAT information message) in a specific frame indicated by an SFN or in a specific subframe by again escaping from a superframe indicated by the superframe offset.

If the topology information message indicator is '0' (off) as a result of confirming the SFH, the MS may confirm the superframe offset included in a paging indicator in a map through which the paging indicator is transmitted or in a predefined location (e.g., a frame or subframe). Therefore, the MS may decode next topology information in a superframe indicated by the superframe offset.

The following Table 3 shows an example of a super frame offset format included in a superframe header which is applicable to the exemplary embodiments of the present invention.

TABLE 3

| Syntax | Size (bit) | Notes |
|---|---|---|
| Super Frame Offset( ){ | — | — |
| ~ | | |
| Topology information message indicator | | 0: Topology information message is not present in current superframe<br>1: Topology information message is present in current superframe |

TABLE 3-continued

| Syntax | Size (bit) | Notes |
| --- | --- | --- |
| If (Topology information message indicator == 1){ SFN (Start Frame Number) } | | SFN: Frame number in which topology information message is located in current superframe. |
| Else { Next Super Frame Number } | | Next Super Frame Number: Next superframe number in which topology information (topology information indicator, SFN of topology information message) is transmitted. |
| ~ }//End of SFH | | |

Referring to Table 3, an SFH may include at least one of a topology information message indicator (or a network topology information message indicator) field, an SFN field, and a next superframe number field. In the exemplary embodiments of the present invention, the topology information message indicator may be expressed by a message indicator.

The topology information message indicator may have a one-bit size. The topology information message indicator set to '0' indicates that the network topology information message is not present in a current superframe and the topology information message indicator set to '1' indicates that the network topology information message is present in a current superframe.

If the topology information message indicator is set to '1', the SFN field may be included in the SFH. In this case, the MS may decode the network topology information message in a frame or a superframe indicated by the SFN field.

If the topology information message indicator is set to '0', the next superframe number field may be included in the SFH. In this case, the MS may decode the network topology information message in a frame or a superframe indicated by the next superframe number field.

The indicators and fields (or parameters) shown in Table 3 may be included in a frame header or an SFH. The indicators and fields (or parameters) may be included in a map message and then may be transmitted to the MS.

According to another embodiment of the present invention, a transmitter and a receiver, which are able to perform the above embodiments of the present invention described with reference to FIGS. 2 to 16, are explained in the following description.

A mobile station (e.g. advanced mobile station) works as a transmitter in uplink or is able to work as a receiver in downlink. A base station (e.g. advanced base station) works as a receiver in uplink or is able to work as a transmitter in downlink. That is, each of the mobile station and the base station includes a transmitter and a receiver for transmission of information and/or data.

Each of the transmitter and the receiver can include a processor, a module, a part and/or a means for performing embodiments of the present invention. In particular, each of the transmitter and the receiver can include a module (means) for encrypting a message, a module for interpreting the encrypted message, an antenna for transceiving the message and the like.

A mobile station used for embodiments of the present invention can include a low-power RF/IF (radio frequency/intermediate frequency) module. And, the mobile station can include means, modules, parts and/or the like for performing a controller function for performing the above-described embodiments of the present invention, a MAC (medium access control) frame variable control function according to a service characteristic and electric wave environment, a handover function, an authentication and encryption function, a packet modulation/demodulation function for data transmission, a fast packet channel coding function, a real-time modem control function, and the like.

A base station is able to transmit data received from an upper layer to a mobile station. The base station can include a low-power RF/IF (radio frequency/intermediate frequency) module. And, the base station can include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

Accordingly, the present invention is applicable to various wireless access systems. And, 3GPP (3rd generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting inter-radio access technology (RAT) information for inter-RAT handover, the method comprising:

receiving, at a mobile station, a super frame header (SFH) including a broadcast channel (BCH), a flag indicating whether the inter-RAT information is transmitted in a current superframe and a start frame number (SFN) field indicating a predetermined frame at which the inter-RAT information is transmitted, wherein the flag is allocated to the BCH; and when the flag is set, acquiring the inter-RAT information at the predetermined frame which is included in the current superframe, wherein if the flag indicates that the inter-RAT information is not transmitted in the current superframe, the method further comprises:

transmitting, at the mobile station, a request message requesting the inter-RAT information to a base station, the request message including an urgent information field indicating whether acquisition of the inter-RAT information is urgent; and receiving, at the mobile station, a response message including the inter-RAT information from the base station, wherein the inter-RAT information is acquired by the base station from a target network information server, if the base station does not include the inter-RAT information.

2. The method according to claim 1, wherein the broadcast channel (BCH) includes a primary broadcast channel and a secondary broadcast channel, and wherein the flag and the start frame number (SFN) field are included in either the primary broadcast channel or the secondary broadcast channel.

3. The method according to claim 1, wherein the inter-RAT information is transmitted through an advanced air interface other RAT advertise (AAI_ORAT-ADV) message.

4. The method according to claim 1, wherein, if the flag indicates that the inter-RAT information is transmitted in the current superframe, the broadcast channel included in the super frame header (SFH) further includes the inter-RAT information.

5. The method according to claim 1, wherein the response message is transmitted to one or more mobile stations in broadcast form.

6. The method according to claim 1, wherein, if the base station does not include the inter-RAT information, the response message includes information about an expected time at which the inter-RAT information is to be transmitted instead of the inter-RAT information.

7. The method according to claim 1, wherein the super frame header (SFH) is a subframe header.

8. A method for transmitting inter-radio access technology (RAT) information for inter-RAT handover, the method comprising:
    transmitting, at a base station, a superframe header (SFH) including a broadcast channel (BCH), a flag indicating whether the inter-RAT information is present in a current superframe and a start frame number (SFN) field indicating a predetermined frame at which the inter-RAT information is transmitted, wherein the flag is allocated to the BCH; and
    when the flag is set, transmitting the inter-RAT information at the predetermined frame which is included in the current superframe,
    wherein if the flag indicates that the inter-RAT information is not transmitted in the current superframe, the method further comprises:
    receiving, at the base station, a request message requesting the inter-RAT information from a mobile station, the request message including an urgent information field indicating whether acquisition of the inter-RAT information is urgent;
    and transmitting, at the base station, a response message including the inter-RAT information to the mobile station, and
    wherein the inter-RAT information is acquired by the base station from a target network information server, if the base station does not include the inter-RAT information.

9. The method according to claim 8, wherein the superframe includes a broadcast channel including a primary broadcast channel and a secondary broadcast channel, and
    wherein the flag and the start frame number (SFN) field are included in either the primary broadcast channel or the secondary broadcast channel.

10. The method according to claim 8, wherein the inter-RAT information is transmitted through an advanced air interface other RAT advertise (AAI_ORAT-ADV) message.

11. The method according to claim 8, wherein, the super frame header (SFH) is a subframe header.

* * * * *